United States Patent
Vislocky

(10) Patent No.: US 10,791,221 B1
(45) Date of Patent: Sep. 29, 2020

(54) NG9-1-1 TEST CALL SYSTEM

(71) Applicant: Michael Vislocky, Boca Raton, FL (US)

(72) Inventor: Michael Vislocky, Boca Raton, FL (US)

( * ) Notice: Subject to any disclaimer, the term of this patent is extended or adjusted under 35 U.S.C. 154(b) by 0 days.

(21) Appl. No.: 15/962,163

(22) Filed: Apr. 25, 2018

Related U.S. Application Data

(60) Provisional application No. 62/489,628, filed on Apr. 25, 2017, provisional application No. 62/570,945, filed on Oct. 11, 2017.

(51) Int. Cl.
*H04M 11/04* (2006.01)
*H04M 3/51* (2006.01)
*H04M 3/32* (2006.01)

(52) U.S. Cl.
CPC ......... *H04M 3/5116* (2013.01); *H04M 3/323* (2013.01); *H04M 2207/18* (2013.01); *H04M 2242/04* (2013.01)

(58) Field of Classification Search
CPC . H04M 3/5116; H04M 3/323; H04M 2207/18
USPC .............................. 455/404.1, 423, 424, 425
See application file for complete search history.

(56) References Cited

U.S. PATENT DOCUMENTS

| | | | |
|---|---|---|---|
| 7,447,160 B1 | 11/2008 | Croak et al. | 370/242 |
| 7,843,841 B2 | 11/2010 | Croak et al. | 370/242 |
| 8,818,354 B1 * | 8/2014 | Bennett | H04L 43/50 370/241 |
| 9,143,966 B2 * | 9/2015 | Brenzel | H04M 1/24 |
| 9,197,316 B1 * | 11/2015 | Hoffman | H04W 4/90 |
| 9,734,715 B2 * | 8/2017 | Cazanas | G08G 1/166 |

(Continued)

OTHER PUBLICATIONS

Rosen, et al., "Framework for Emergency Calling Using Internet Multimedia", Dec. 2011, pp. 1-38.

(Continued)

*Primary Examiner* — Marceau Milord
(74) *Attorney, Agent, or Firm* — Stein IP, LLC

(57) ABSTRACT

An NG9-1-1 Test Call System provides for comprehensive testing for NG9-1-1 emergency calling systems. The Test Call System may include a Test Call Manager, a Test Call Generator and a Test Call Responder (or Receiver). While the NG9-1-1 Test Call System exercises the telephone network it does not consume resources of the NG9-1-1 emergency calling system, i.e., the emergency calling system PSAP is not used for testing. One function of the Test Call Manager is the creation of a Test Call Profile created to satisfy some test coverage criteria. The Profile may specify parameters of a suite of test calls including desired call handling destination (PSAP), originating network or geographic region, time or date for the start of testing, time or date for the end of testing, rate of test calls, number of test calls. Based on the geographic parameters the Profile is distributed to an appropriate Test Call Generator and an appropriate Test Call Responder (Receiver). The Profile is used at the Test Call Generator to generate and transmit the test calls defined in the Profile. The Profile is used at the Test Call Responder (Receiver) to determine if the calls defined in the Profile are or are not received. Reports on the receipt or non-receipt of test calls are then used to inform users/ maintenance function of the actual state of the emergency calling system.

29 Claims, 10 Drawing Sheets

(56) References Cited

U.S. PATENT DOCUMENTS

| | | | |
|---|---|---|---|
| 9,749,884 B1* | 8/2017 | Cummings | H04L 43/045 |
| 2003/0134648 A1* | 7/2003 | Reed | H04W 4/029 |
| | | | 455/456.1 |
| 2008/0045234 A1* | 2/2008 | Reed | H04W 8/02 |
| | | | 455/456.1 |
| 2013/0190010 A1* | 7/2013 | Chiou | H04W 24/10 |
| | | | 455/456.1 |
| 2014/0065997 A1* | 3/2014 | Walker | H04W 4/90 |
| | | | 455/404.1 |
| 2015/0137967 A1* | 5/2015 | Wedig | G08B 25/016 |
| | | | 340/501 |
| 2015/0170503 A1* | 6/2015 | Wedig | G08B 7/066 |
| | | | 340/691.5 |
| 2015/0201067 A1* | 7/2015 | Chen | H04M 3/2218 |
| | | | 379/45 |
| 2016/0249239 A1* | 8/2016 | Aftab | H04W 24/06 |
| 2017/0164176 A1* | 6/2017 | Lieu | H04W 4/90 |
| 2017/0245163 A1* | 8/2017 | Tagg | H04W 24/08 |
| 2017/0353524 A1* | 12/2017 | Dacutanan | H04W 4/24 |
| 2018/0052763 A1* | 2/2018 | Green | G06F 11/3684 |
| 2018/0053401 A1* | 2/2018 | Martin | H04L 67/04 |
| 2018/0310159 A1* | 10/2018 | Katz | H04W 4/90 |

OTHER PUBLICATIONS

Gellens, et al., "Next-Generation Vehicle-Initiated Emergency Calls", May 2017, pp. 1-40.

Gellens & Tschofenig, "Next-Generation Pan-European eCall", May 2017, pp. 1-43.

Kaplan, "A Media-Based Traceroute Function for the Session Initiation Protocol (SIP)", Nov. 2014, pp. 1-7.

Rosen & Polk, "Best Current Practice for Communications Services in Support of Emergency Calling", Mar. 2013, pp. 1-28.

\* cited by examiner

Figure 5

```
INVITE urn:service:test.sos SIP/2.0
To: urn:service:test.sos
From: <sip:+13145551111@example.com>;tag=9fxced76sl
Call-ID: 3848276298220188511@atlanta.example.com
Geolocation: <cid:target123@example.com>
Geolocation-Routing: yes
P-Access-Network-Info:3GPP-E-UTRAN-FDD;utran-cell-id-3gpp=0FE0BADBEEF
Call-Info: <cid:1234567890@atlanta.example.com>;
        purpose=TestEmergencyCall.Info
Accept: application/sdp, application/pidf+xml,
        application/TestEmergencyCall.Info+xml
CSeq: 31862 INVITE
Allow: INVITE, ACK, PRACK, INFO, OPTIONS, CANCEL, REFER, BYE,
       SUBSCRIBE, NOTIFY, UPDATE
Content-Type: multipart/mixed; boundary=boundary1

--boundary1
Content-Type: application/sdp

...Session Description Protocol (SDP) for test media...

--boundary1
Content-Type: application/pidf+xml
Content-ID: <target123@example.com>
Content-Disposition: by-reference;handling=optional ...PIDF-LO for location of test call...

--boundary1
Content-Type: multipart/signed;
     protocol="application/pkcs7-signature";
     micalg="sha1"; boundary="signedBoundary1"
Content-ID: <1234567890@atlanta.example.com>
Content-Disposition: by-reference;handling=optional --signedBoundary1
Content-Type: application/TestEmergencyCall.Info+xml
Content-ID: <1234567890@atlanta.example.com>
Content-Disposition: by-reference;handling=optional <?xml version="1.0" encoding="UTF-8"?>
<TestEmergencyCall.Info>
    xmlns="urn:ietf:params:xml:ns:TestEmergencyCall.info"
    xmlns:xsi="http://www.w3.org/2001/XMLSchema-instance">
    <testRequest SendCallsURI="https://testgen.example.org/tgi"
            SendCallsToken="012345678@lec.example.com"
            ProfileID="88BAD88" TargetPSAP="EXAMP9">
        <requestLocation>
        .PIDF-LO for location of test call replicated here.
        </requestLocation>
        <requestAccessInfo>
        3GPP-E-UTRAN-FDD;utran-cell-id-3gpp=0FE0BADBEEF
        </requestAccessInfo>
        <requestCallback>tel:+10005551212</requestCallback>
    </testRequest>
</TestEmergencyCall.Info>

--signedBoundary1
Content-Type: application/pkcs7-signature

...signature goes here...

--signedBoundary1--

--boundary1--
```

```
SIP/2.0 200 OK
To: urn:service:test.sos;tag=8gydfe65t0
From: <sip:+13145551111@example.com>;tag=9fxced76sl
Call-ID: 3848276298220188511@atlanta.example.com
```
Figure 6
```
Call-Info: <cid:2345678901@atlanta.example.com>;
           purpose=TestEmergencyCall.Info                   601
Accept: application/sdp, application/pidf+xml,
        application/TestEmergencyCall.Info+xml
CSeq: 31862 INVITE
Recv-Info: EmergencyCallData.eCall.VEDS
Allow: INVITE, ACK, PRACK, INFO, OPTIONS, CANCEL, REFER, BYE,
       SUBSCRIBE, NOTIFY, UPDATE
Content-Type: multipart/mixed; boundary=boundaryX
Content-Length: ...

—boundaryX
Content-Type: application/sdp

...Session Description Protocol (SDP) goes here...

—boundaryX
Content-Type: text/plain                                    608 atlanta.example.com
urn:service:test.sos
...PIDF-LO copied or resolved from INVITE...

—boundaryX                                                  603
Content-Type: application/EmergencyCallData.Test.Info+xml
Content-ID: <2345678901@atlanta.example.com>
Content-Disposition: by-reference                           602

<?xml version="1.0" encoding="UTF-8"?>
<TestEmergencyCall.Info
    xmlns="urn:ietf:params:xml:ns:TestEmergencyCall.info"
    xmlns:xsi="http://www.w3.org/2001/XMLSchema-instance">
                                                            604
    <testResult
        SendCallsToken="012345678@lec.example.com"
        ProfileID="88BAD88" TargetPSAP="DSUDE" >
        <resultLocation>                                    605
            ...PIDF-LO copied or resolved from INVITE...
        </resultLocation>
        <resultEntity type="PSAP" id="EXAMP9" />  ◄— 606
        <resultCallback statusCode="200">tel:+10005551212
        </resultCallback>
    </testResult>                                           607
</TestEmergencyCall.Info>

—boundaryX—
```

Test Call Responder

NG9-1-1 TEST CALL SYSTEM

CROSS-REFERENCE TO RELATED APPLICATIONS

This application claims the benefit of priority to U.S. Provisional Application No. 62/489,628, filed Apr. 25, 2017, and U.S. Provisional Application No. 62/570,945, filed Oct. 11, 2017, the disclosures of which are incorporated herein in their entireties by reference.

BACKGROUND OF THE INVENTION

1. Field of the Invention

An important component in the provision of telephone services is the completion of calls seeking emergency assistance. This component was originally denoted as the 9-1-1 system. Over the years as the complement of devices used in the provision of telephone services has expanded, it has been necessary to adapt the 911 system to accommodate this expansion. For example, telephone service was originally provided only through wired devices over analog circuits. Over the years, however, wireless devices and digital circuits have also become popular components in the provision of telephone services. This has required the component designed to complete calls for emergency services to be adapted accordingly.

Work is now underway on defining the next generation emergency calling system denoted as NG9-1-1. The art has recognized that testing of the 9-1-1 system is advantageous. RFC 6881 Section 15 (https://tools.ietf.org/html/rfc6881#page-21) describes a test call mechanism that is intended to test Emergency Services IP Networks (ESInets) and NG9-1-1 Core Services facilities and NG9-1-1 compliant Public Safety Answering Points (PSAP) that are required to deliver a 9-1-1 call from an originating service provider to the correct Public Service Answering Point. This invention utilizes this recommended test call mechanism.

However, the mechanism described in RFC 6881 is incapable of satisfying the need for current information on the status of the emergency calling system. For example, RFC 6881 recommends tests be used to gauge service viability and recommends that tests be repeated at intervals of about 30 days with some random interval. Testing only once per thirty days will fail to provide the up to date information on the availability of emergency calling facilities.

SUMMARY OF THE INVENTION

The invention provides a method and system for enhanced testing of NG 9-1-1 and related apparatus designed to support telephone calls seeking emergency services. A major improvement achieved by the invention is automated testing which is designed to reveal defects in the emergency call handling apparatus before a real emergency call is affected by a problem or defect. An additional feature is the ability to stress test the emergency handling system by controlling the rate of presentation of test emergency calls. The invention supports initiating test calls from mobile devices, either cell phones, tablets and the like as well as movable (nomadic) wired devices. The invention incorporates various technologies to generate test calls that contain caller location information that can simulate calls coming from any location. This feature tests the ability of the NG9-1-1 system to route calls from any specific location to the correct PSAP.

The invention can be referred to as the NG9-1-1 Test Call System. The purpose of the NG9-1-1 Test Call System is to test and verify the correct operation of the various elements in the NG9-1-1 call processing system and if there are faults, failures, or obstructions to the effective delivery of emergency 9-1-1 calls from callers to the correct Public Service Answering Point (PSAP), to report those faults or restrictions to the entities that need to know and to those that can take remedial action. The invention can also be used to stress test the NG9-1-1 call processing system and determine the system's ability to process 9-1-1 calls at a high call volume. The NG9-1-1 Test Call System can also automatically test the ability of a PSAP to complete a call-back to a 9-1-1 calling device if the original call is disconnected. The NG9-1-1 Test Call System also supports initiating test calls from mobile devices such as cell phones and tablets, as well as fixed and moveable (nomadic) wired devices. The NG9-1-1 Test Call System can incorporate various technologies to determine the location of devices that initiate test calls. In addition, as an alternative to determining the location of a device that initiates a test call, the System can employ configured, selected, or generated locations (or information that indirectly is used as or associated with course location or to determine location). The System can automatically employ these various techniques as needed to satisfy test criteria. The NG9-1-1 Test Call System can support various means of initiating test calls from a Test Call Generator using various devices, including dialing a special number. Test calls may be initiated automatically, by agents using authorized devices, or by consumers. The System can operate in fully automatic, partially automatic, manual, or mixed modes. The System can determine sets of test calls that will meet configured test coverage criteria, initiate such test calls, and compare the results of such calls against the expected results, notifying entities of errors, unexpected results, and correct or successful results.

RFC 6881 Section 15 (https://tools.ietf.org/html/rfc6881#paqe-21) describes a test call mechanism that is intended to test Emergency Services IP Networks (ESInets) and NG9-1-1 Core Services facilities and NG9-1-1 PSAP facilities that are required to deliver a 9-1-1 call from an originating service provider to the correct PSAP. This invention utilizes this recommended test call mechanism.

There are currently no known systems to automatically and periodically test Emergency Services IP Networks (ESInets) and NG9-1-1 Core Services facilities and PSAP facilities that are required to deliver a 9-1-1 call from an originating service provider to the correct PSAP.

Thus, in one aspect the invention provides a method of automated testing for emergency calling, comprising establishing a set of test calls to satisfy test coverage criteria; initiating the set of test calls; and determining whether or not any of said test calls are not received. In another aspect the invention provides a system for testing an emergency calling system including a test call responder, said test call responder including receiving means responsive to parameters from a test call profile for determining whether a test call from said test profile has been received, and reporting means in said test call responder responsive to said receiving means for reporting whether or not the receiving means has received said test call. In another aspect the invention further includes a test call generator, said test call generator including generator means responsive to a test call profile for generating and transmitting test calls with parameters matching parameters of test calls from said profile. In another aspect the invention includes a test call manager including managing means for controlling operations of said test call responder and said test call generator.

BRIEF DESCRIPTION OF THE DRAWINGS

The present invention will be further described in the following specification and illustrated in the attached drawings in which:

FIG. 5 is an example of a Session Invitation Protocol (SIP INVITE) message (which may be used to initiate an emergency test call, which message contains a Test Info data block as a body part 505.

FIG. 6 is an example of a SIP final response in the form of a 200 OK status result.

DETAILED DESCRIPTION OF THE EMBODIMENTS

Figure 1:
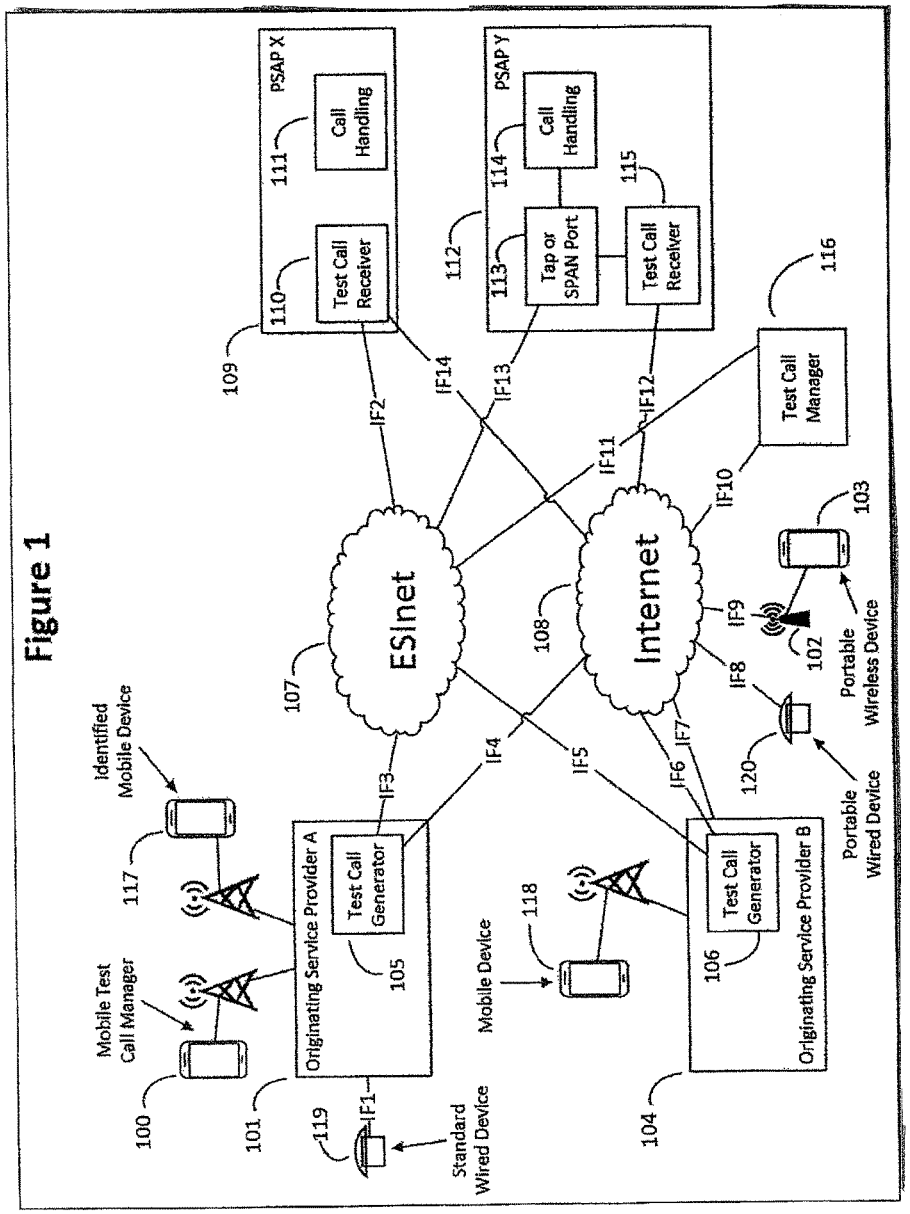
FIG. 1 illustrates an embodiment of the NG9-1-1 Test Call System in relation to important components of the conventional telephone system, specifically shown are a Test Call Manager 116, Test Call Generators 105, 106, Test Call Responders 110, 115, and a Mobile Test Call Manager 100.

A Test Call System performs fully automated, semi-automated, manual, or partially manual testing, verification, and/or reporting of emergency calling capabilities sufficient to satisfy desired parameters. The parameters may include one or more of a receiving PSAP; a receiving ESInet (which may include all PSAPs receiving calls via that ESInet); an Originating Network (which may include all PSAPs and/or ESInets that may receive calls originating within the Originating Network); a geographic location, region, or area; an access point (such as a cell tower, Wi-Fi AP, fiber identification, etc.); a subtype of Origination Network (such as a wired or wireless service area of an Origination Network); a time/date at which to start testing; a time/date at which testing should conclude; the number of Test Calls to be performed; the rate at which Test Calls should occur (which may be specified as different rates at different days, times, days of weeks, times of year); or any combination of one or more of these. A Test Call System may test the essential functionality of emergency calls and may test enhanced capabilities or functionality of emergency calls. Enhanced functionality may include calls that are, or appear to be, or that test the functionality of, vehicle-initiated emergency calls (often referred to as Automatic Collision (or Crash) Notification (ACN) or Advanced Automatic Collision (or Crash) Notification (AACN)), which are emergency calls that typically are marked as such and that carry vehicle and/or incident related data; calls that carry sensor data or that mimic or test the functionality of sensor-related calls, which include automated calls that may or may not include interactive communications, for example, calls that appear to be generated by a building intrusion or fire or flood detection system, or a medical device, or calls associated with various transportation equipment such as motorcycles, wheelchairs, bulldozers or other construction equipment, etc.

A Test Call Manager controls the operation of the Test Call System as it pertains to an area of responsibility such as a region, a network, one or more PSAPs, one or more ESInets, or one or more other areas of authority. A Test Call Manager causes Test Calls to be originated and ascertains the results of the Test Calls. A Test Call Manager may use various sets of criteria in determining when to cause various Test Calls to be initiated and in determining the attributes and aspects of the Test Calls. A Test Call Manager may cause Test Calls to be initiated from or to appear to originate from an origination area (which may be any origination point within an Originating Network, or may be a geographic area served by one or more Originating Networks, or may be a part of an Originating Network, or may be one or more Originating Devices, or other determined origination, for example, selected by geographic location, network topographic location, etc.). A Test Call Manager may assign a specific location per Test Call or range of Test Calls. The assigned location may be a specific geographic point (as a latitude and longitude with or without altitude), or a civic address, or an area which may be a geo-area (as a geographic shape such as an arc, circle, ellipsoid, rectangle, or other shape, centered around a geographic point or described in terms of one or more geographic points) or a civic area (such as a city or county or state or other defined area), or may be indirectly specified as an AP (access point) such as a cell tower or cell site and sector, or a Wi-Fi AP, or a fiber or cable identification, etc. The assigned location may be randomly chosen or may be determined in part by randomization, for example, a random point within a specified distance of a point or area or a random point within an area or within a specific distance of a border of an area. In one example, a Test Call Manager may assign locations designed to cause Test Calls to be routed to a specific PSAP. The Test Call Manager may then determine if the Test Calls reached the intended PSAP.

A Test Call Manager may be configured to cause Test Calls to be initiated (or configured such that the Test Call Manager determines to initiate Test Calls) at fixed intervals, or at random intervals, or random intervals within an interval range or with a minimum and maximum flow (e.g., a minimum and/or maximum number of Test Calls within a time interval). The configuration may indicate that Test Calls are to start at a specified time and date and continue indefinitely, or until a later specified time and date, or until a specified time interval (e.g., a certain number of days or months) has elapsed, or until a certain number of Test Calls have been generated. The configuration may indicate flow rates of Test Calls depending on factors, such as a specific number of Test Calls per time period, or a specified range of Test Calls per time period. The flow rates may be configured per day-of-week, time-of-day, month, standard work days versus common holidays, etc. A user may configure the Test Call Manager, i.e., write Profiles, either at the location of the Test Call Manager or remotely via a browser or the like.

A Test Call Manager may ascertain to which PSAP a Test Call would normally be routed (e.g., when a criterion specifies that Test Calls are to be generated that originate or appear to originate from a geographic area), or may cause Test Calls to be initiated that are intended to be routed to a specific PSAP (e.g., when a criterion specifies that Test Calls are to be generated that are delivered to a specific PSAP). The Test Call Manager may then determine if a Test Call was routed to the intended PSAP. As an example, a Test Call Manager operated by or on behalf of or under the authority of a PSAP may cause Test Calls to be initiated to test that emergency calls originating or appearing to originate within the service boundaries of the PSAP are routed to the PSAP and reach the PSAP; such a Test Call Manager may cause such Test Calls to originate within one or more Origination Networks that may normally originate emergency calls within the service boundaries of the PSAP. In some cases, PSAPs that serve adjacent areas may arrange that emergency calls originating in certain locations within the service area of one PSAP are to be routed to a different PSAP (e.g., calls originating within a shopping mall or stadium that is within the service area of one PSAP may be routed by arrangement to a different PSAP); a Test Call Manager might be configured to periodically verify that calls that originate or appear to originate in such a location are routed to and received by the correct PSAP.

A Test Call Generator initiates Test Calls. A Test Call Generator may be physically or virtually located within a specific region or area, or may be physically or virtually connected to an Originating Network, or a specific part of an Originating Network. For example, Test Call Generators may be established that are connected to or appear to be connected to a wireless service area or wired service area of an Originating Network. To continue this example, Test Call Generators may be instantiated that originate or appear to originate calls from within a specific location served by the wireless or wired or another service area of an Originating Network that serves that location.

A Test Call Generator may be operated by one entity on behalf of another. The Test Call Generator may be embodied as one entity; as two or more entities that cooperate (split functionality), for example, as a Session Initiation Protocol (SIP) User Agent (UA) or Back-to-Back User Agent (B2BUA) (e.g., within an originating network) that receives and relays signaling messages from a SIP UA within a Test Call Generator (e.g., within a PSAP or ESInet or third-party testing service), or as a virtual entry point or virtual private network (VPN) access point (e.g., located within an originating network) accessible by or under control of an entity such as a Test Call Generator located elsewhere (e.g., within a PSAP or ESInet or third-party testing service provider); other embodiments are also possible. A Test Call Generator may be part of, within, or tightly or loosely coupled with a Test Call Manager or Test Call Responder. A Test Call Generator may be embodied as or within a device that generates Test Calls, a device that relays or facilitates Test Calls, some other device, or as a logical entity that performs these or similar functions in coordination with a Test Call Manager.

Test Call Generators may reduce the frequency at which test calls are generated by one or more configurations (e.g., one or more Test Call Profiles), or pause or suspend or make inactive one or more configurations, if all or a portion of test calls arising because of such configurations fail or result in errors.

A Test Call Responder receives Test Calls. A Test Call Responder may accept or reject the calls and may take other actions, such as accepting a Test Call and sending data as described in RFC 6881 or sending other data instead of or in addition to the data described in RFC 6881. For example, a Test Call Responder may send data that acknowledges receipt of the Test Call, indicates if it was received by a PSAP and if so which one, or indicates which entity received the call if not a PSAP (e.g., a legacy interworking function or interface). A Test Call Responder may receive data sent along with the Test Call initial call request, such as a request that a call-back be tested. A Test Call Responder may test call-back functionality, for example, by initiating a call back before or after the termination of the Test Call.

The Test Call Responder may be embodied as one entity, as two or more entities that cooperate (split functionality), or as another embodiment. A Test Call Responder may be part of, within, or tightly coupled with a Test Call Manager or Test Call Generator. A Test Call Responder may be embodied as or within a device that receives calls, a device that relays or facilitates calls, some other device, or as a logical entity that performs these or similar functions in coordination with a Test Call Manager and/or Test Call Generator. A Test Call Responder may be configured with Test Call Profiles so that it expects Test Calls as indicated in the profiles.

A Test Call Manager may configure, provision, instruct or direct a Test Call Generator to initiate one or more Test Calls according to various criteria. A Test Call Manager may ascertain the result of a Test Call by detecting if the call was accepted or rejected, by analyzing data sent within the call (for example, data sent by the answering entity in accordance with RFC 6881, data exchanged in one or both directions during the call (such as vehicle and/or incident data sent with the call initiation per AACN standards and data sent acknowledging receipt of such data also per AACN standards), data sent in one or both directions in addition to or instead of RFC 6881 data, etc.), and/or by communication or coordination with a Test Call Generator and/or a Test Call Responder.

Test Call Reports include alerts and notifications of failures and error conditions, verification of correct functionality, information about generated loads or peaks, and other information related to the Test Call System. Test Call Reports may be generated by one or more of a Test Call Manager, a Test Call Generator, and a Test Call Responder. Test Call Reports may be generated for each failure, error, anomaly, or unexpected event (e.g., a Test Call being received by an unexpected entity), or may contain reports of multiple failures, errors, anomalies, or unexpected events. Failures, anomalies, and successful results may be reported together or separately, reported for individual test calls, series of test calls, Test Call Profiles, geographic regions, types of origination network, types of origination devices, time ranges, or another criterion. Test Call Reports may be generated for each series of Test Calls indicated in a configuration, at the conclusion of each series of Test Calls, or at intervals as indicated in the configuration.

Figure 2:
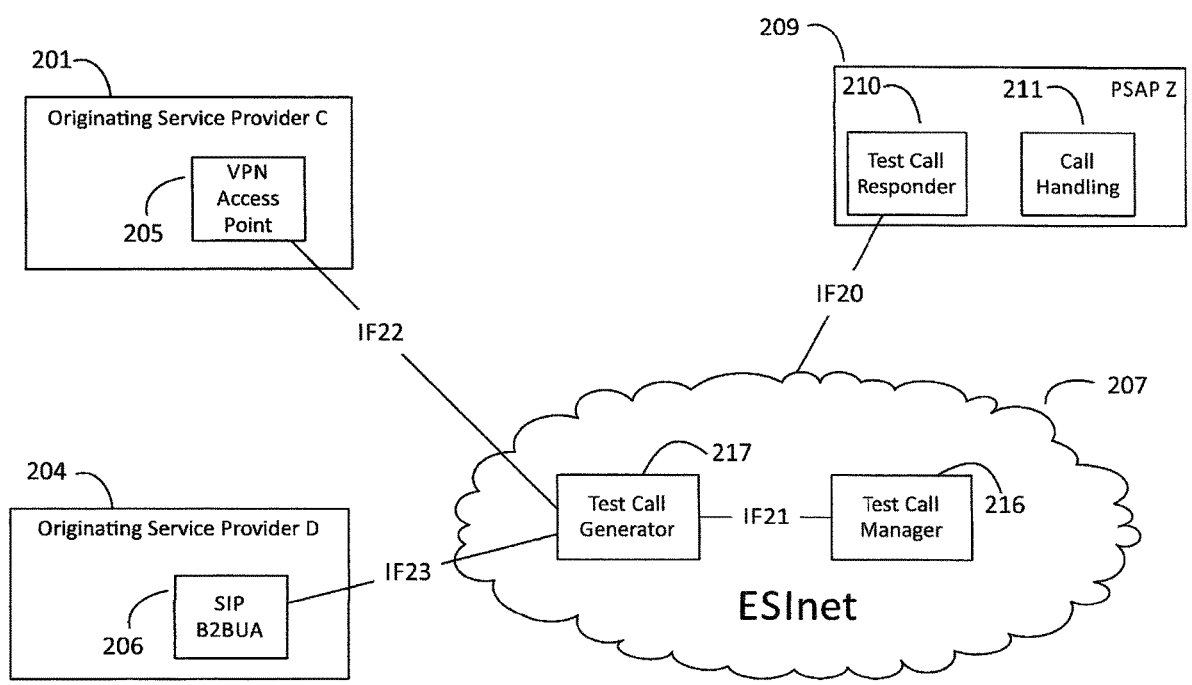
FIG. 2 illustrates another embodiment of the NG9-1-1 Test Call System where the Test Call Manager 216 is located within the ESInet 207, and the Test Call Generator is split, with the main logic contained in element 217 cooperating with a VPN access point 205 located within Originating Service Provider C 201, and with a Back-to-Back SIP User Agent 206 located within Originating Service Provider D 204.
Figure 3:
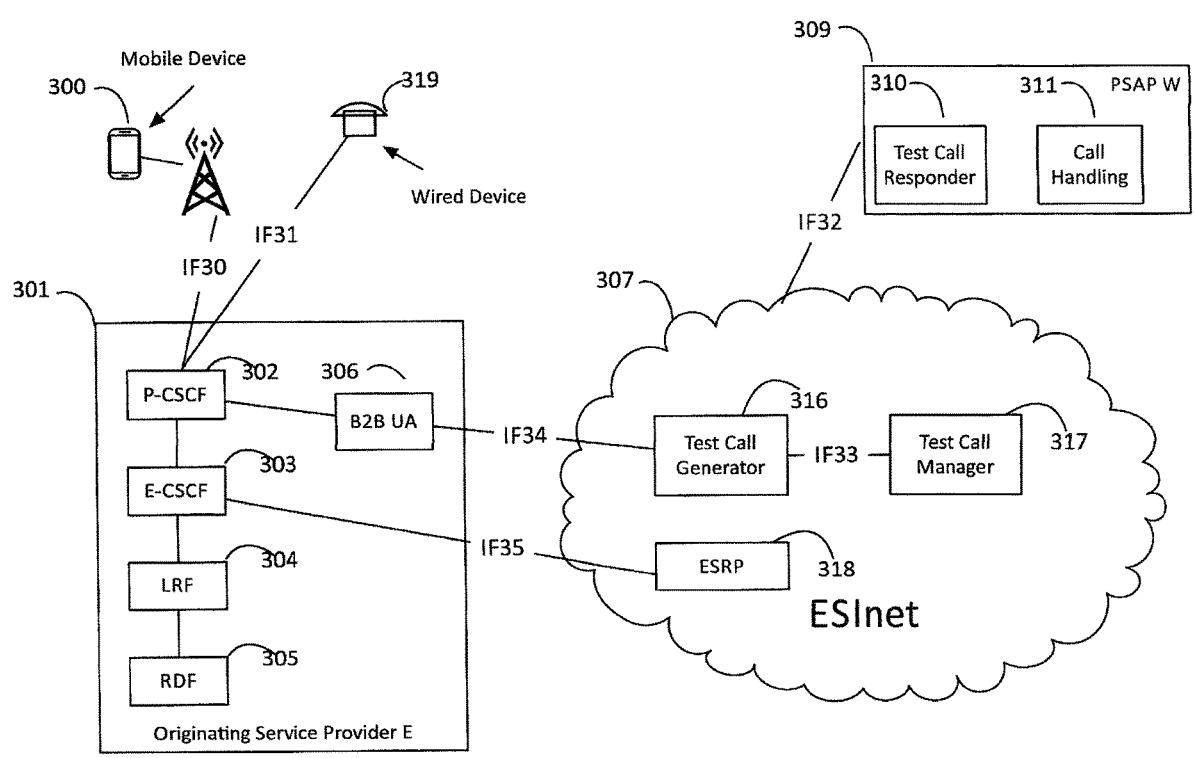
FIG. 3 illustrates another embodiment of the NG9-1-1 Test Call System where the Originating Service Provider E 301 is a 3GPP IMS network containing a Proxy Call Session Control Function (P-CSCF) 302, an Emergency Call Session Control Function (E-CSCF) 303, a Location Retrieval Function (LRF) 304, and a Routing Determination Function (RDF) 305, and the ESInet 307 contains an Emergency Services Routing Proxy (ESRP) 318.

In some embodiments, the Test Call Responder may be collocated with or incorporated within the Test Call Manager. This allows the invention to be implemented in a simpler fashion in certain situations. As an example, a Test Call Manager operated by or on behalf of a PSAP might incorporate a Test Call Responder, to simplify the verification and reporting functions. As a further simplification of such an embodiment, one or more Test Call Generators may be embodied as split functionality, with one part initiating call signaling via or through SIP back-to-back user agents or VPN access points located within or connected to one or more Origination Networks. This is illustrated in FIG. 2 and FIG. 3.

Origination Networks may use one or more of various techniques for determining the location of an emergency call. Origination Networks may use a coarse or highly approximate location for emergency call routing while simultaneously or subsequently initiating various means of determining a fine or more accurate location for use by a PSAP (e.g., for dispatch). For example, a wireline network may use a wiremap or other database or lookup to retrieve or determine a location (such as a civic address) associated with the wired access point where an emergency call originates, a wireless network may use the location or address of a cell tower where a wireless call originates, or the geographic coverage area of cell tower or site/sector where a wireless call originates, and/or various location determination technologies for more precise location determination such as SUPL (Secure User Plane Location), control plane signaling, procedures associated with a NEAD (National Emergency Address Database) location lookup or determination, Bluetooth location beacons, access network positioning signals, etc. A wireless network may use a configured or predetermined location associated with a cell as a location for routing while using the location of the cell as an initial location for delivery to a PSAP (e.g., for dispatch) and a determined or estimated location as a subsequent location for delivery to a PSAP (e.g., for dispatch). Devices and clients initiating emergency calls may obtain their own location, as a location value (which may be a civic address or a geolocation point or area or shape), a location reference (which may be a URI that may be resolved by authorized entities to obtain a location value), and/or indirect location information, such as identifying information regarding the access mechanism (e.g., a PLMN (Public Land Mobile Network) cell type and identifier), and include or convey this location value or reference, and/or indirect information, when initiating an emergency call. Originating Networks may use or ignore location information supplied with an emergency call initiation; Originating Networks may check client-supplied location against other location determination means before deciding to use or ignore it or may check location estimates or values determined by other means against such client supplied location. Origination Networks may use different techniques when determining a location for routing and for dispatch, and may use different techniques at different times during a call; e.g., when determining a location to be used to determine how to route an emergency call, Origination Networks may use a configured or predetermined location associated with the connection point of a device (such as a radio cell for PLMN devices), while using various position determination techniques when determining a location for dispatch (e.g., Origination Networks handling an emergency call initiated by a PLMN device may initiate device-assisted position determination techniques (e.g., 3GPP Control Plane or OMA Secure User Plane Location (SUPL)) at the start of the emergency call, and may return the location of the cell currently being used by the device when a location for dispatch is requested before the position determination techniques have resulted in a location estimate, and may return the current location estimate determined by the position determination techniques to a subsequent request for location for dispatch, and may continue with various position determination techniques which may result in a more accurate locate estimate.

Figure 4:
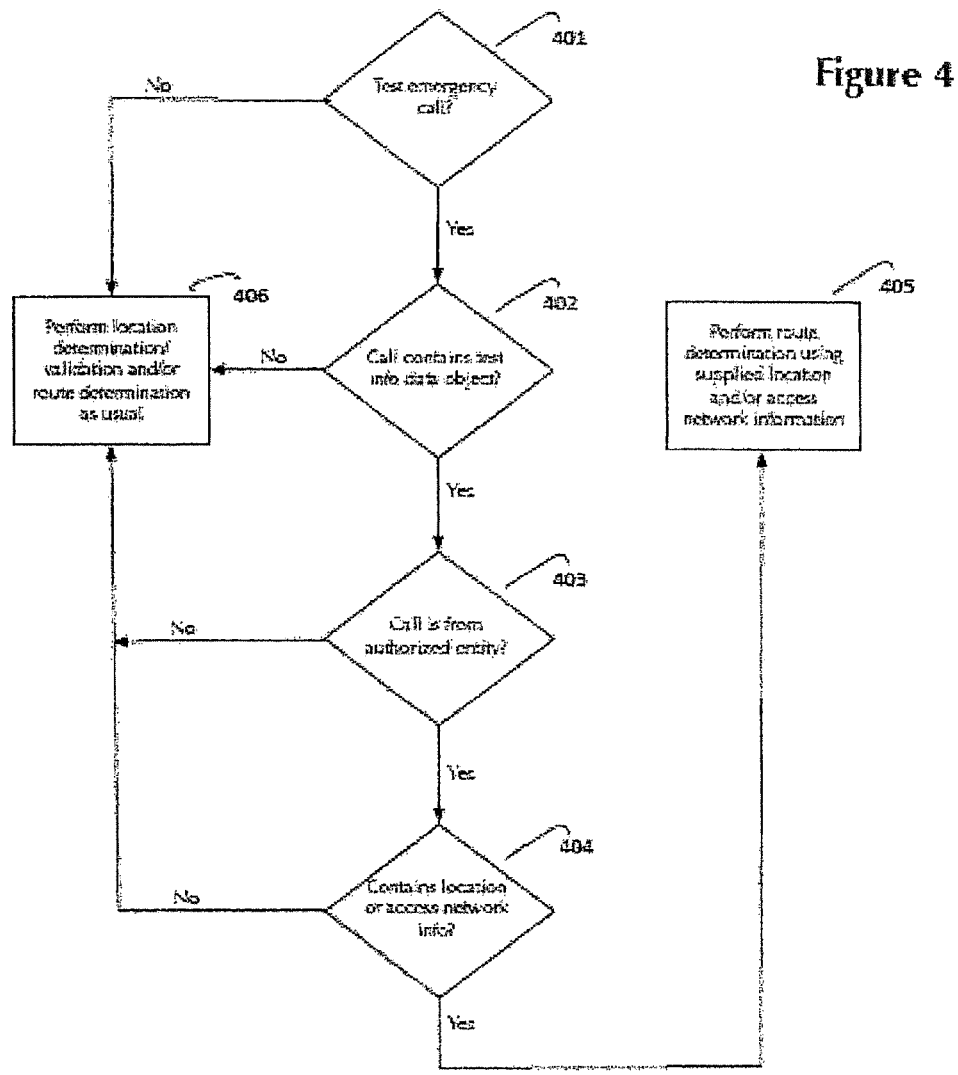
FIG. 4 is a flowchart showing steps that may be executed by the E-CSCF 303 or other element within an Originating Service Provider E 301 to determine if normal emergency call location determination and/or route determination should be performed or if instead the location or access network information (e.g., an access type and access point, such as an air interface type and cell identification) supplied with the test emergency call should be used for route determination.

In some embodiments, an Origination Network may use location information or access network access point information (e.g., a PLMN cell identification) supplied with a Test Emergency Call initiation even if the Origination Network would ignore or verify location or access network information supplied with a non-test emergency call. In some embodiments, an Origination Network may do so only for Test Emergency Calls initiated by certain entities, such as a PSAP or service within an ESInet or entity operated by or on behalf of an Origination Network, an ESInet, or a PSAP, or for test calls where the signaling has been routed via a known or verifiable entity such as an element operated by or on behalf of the Origination Network. In some embodiments, a Test Call Generator may include information within the Test Call initiation signaling that verifies the identity of the entity originating the Test Call, or that verifies the authorization of the entity to supply location information. In some embodiments, the verification may take the form of a digital signature applied to information within the signaling. This is illustrated in FIG. 3, FIG. 4, and FIG. 5. In FIG. 3, Originating Service Provider E 301 is a 3GPP IMS origination network containing a Proxy Call Session Control Function (P-CSCF) 302, an Emergency Call Session Control Function (E-CSCF) 303, a Location Retrieval Function (LRF) 304, and a Routing Determination Function (RDF) 305, and the ESInet 307 contains an Emergency Services Routing Proxy (ESRP) 318. The P-CSCF 302 has been configured to forward both test and non-test emergency calls to the E-CSCF 303. Using the example steps illustrated in FIG. 4, the E-CSCF 303 determines:

if a call is a test emergency call (401), and
if so, if it contains test call information such as illustrated in FIG. 5 (402), and
if so, if the call and Test Call Info are from an authorized entity such as Test Call Generator 316 (403), such as by examining the Test Info 504 to verify the source and validity of the digital signature and/or by verifying that the call was routed via B2B UA 306 and/or Test Call Generator 316, and
if so, if the call contains location or access network information (404), and
if so, performing routing determination using the contained location or access network information (405), and
if any of the above tests are false, performing location verification and/or determination, and/or routing determination, as usual (406).

Similarly, in some embodiments, when an Origination Network provides location information for dispatch to a PSAP, the Origination Network may use location information supplied with a Test Emergency Call initiation even if the Origination Network would ignore or verify location information supplied with a non-test emergency call. In some embodiments, an Origination Network may do so only for Test Emergency Calls initiated by certain entities, such as a PSAP or service within an ESInet or entity operated by or on behalf of an Origination Network, an ESInet, or a PSAP, or for test calls where the signaling has been routed via a known or verifiable entity such as an element operated by or on behalf of the Origination Network. In some embodiments, a Test Call Generator may include information within the Test Call initiation signaling that verifies the identity of the entity originating the Test Call, or that verifies the authorization of the entity to supply location information. In some embodiments, the verification may take the form of a digital signature applied to information within the signaling. This is illustrated in FIG. 3, FIG. 4, and FIG. 5. In FIG. 3, Originating Service Provider E 301 is a 3GPP IMS origination network containing a Proxy Call Session Control Function (P-CSCF) 302, an Emergency Call Session Control Function (E-CSCF) 303, a Location Retrieval Function (LRF) 304, and a Routing Determination Function (RDF) 305, and the ESInet 307 contains an Emergency Services Routing Proxy (ESRP) 318. The P-CSCF 302 has been configured to forward both test and non-test emergency calls to the E-CSCF 303. When providing location information for dispatch, LRF 304 may perform steps such as determining:

- if a call is a test emergency call, and
- if so, if it contains test call information such as illustrated in FIG. 5, and
- if so, if the call and Test Call Info are from an authorized entity such as Test Call Generator 316, such as by examining the Test Info 504 to verify the source and validity of the digital signature and/or by verifying that the call was routed via B2B UA 306 and/or Test Call Generator 316, and
- if so, if the call contains location information, and
- if so, providing a location for dispatch using the contained location information, and
- if any of the above tests are false, performing location verification and/or determination as usual.

A Test Call Generator may include information or data within the test call initiation (such as within a SIP INVITE message) containing information allowing the test call to be traced to the Test Call Generator and optionally the Test Call Profile that caused it to be initiated, such as information 511 in FIG. 5, and/or requesting that additional testing be performed such as a request for call-back testing 506, and/or other information or requests relating to the test call.

Including information in the test call initiation allowing the test call to be traced to the Test Call Generator that initiated the test call, and optionally the Test Call Profile that caused it to be initiated, such as information elements 511 in FIG. 5, allows any receiver of the test call, including a service within the intended ESInet, PSAP, or other entity as well as any unintended receivers (as for example if a call is routed incorrectly or otherwise presented unexpectedly) to have available the information needed to alert the Test Call Generator that a call was successfully received or erroneously routed or unexpectedly received. It also provides the information to permit the receiving entity to request the Test Call Generator to stop initiating test calls, such as if test calls are being generated too frequently and/or for too long a duration, for example, if a Test Call Profile incorrectly causes a Test Call Manager or Test Call Generator to initiate unwanted calls or to flood an entity with calls, or if test calls are being received at an unexpected entity.

A Test Call Responder may include information within a response to a test call initiation request in addition to or instead of the RFC 6881 information. For example, a Test Call Responder may include in a SIP final response a data object such as illustrated as 603 in FIG. 6 that contains information copied from the test call request, such as an identifier tying the call to a Test Call Profile (e.g., 604 in FIG. 6), and/or information regarding the Test Call Responder, such as the type of entity (such as a PSAP or Legacy PSAP Gateway or other component) with which the Test Call Responder is associated and/or an identifier for the Test Call Responder or its associated entity (e.g., 605 in FIG. 6), the progress or status of the call or additional tests, such as the result of a requested call-back). This information may be included in signaling messages that indicate any type of result, including successful results (e.g., a SIP 200 OK status code) or other results (e.g., a SIP 486 Busy Here status code).

Including information in the response to a test call initiation request (such as a SIP final response) copied from the test call request, such as an identifier tying the call to a Test Call Profile (e.g., 604 in FIG. 6), and/or information regarding the Test Call Responder, such as the type of entity (such as a PSAP or Legacy PSAP Gateway or other component) with which the Test Call Responder is associated and/or an identifier for the Test Call Responder or its associated entity (e.g., 605 in FIG. 6), the progress or status of the call or additional tests, such as the result of a requested call-back) allows the Test Call Generator to update information or to convey to a Test Call Manager information associated with the Test Call Profile that caused the test call to be initiated. For example, information and statistics as to the number of successful or failed test calls generated as a result of the Test Call Profile can be maintained.

A PSAP and/or ESInet may provide an interface (such as a web service or other protocol "binding" interface) to allow originating networks to register as an originating network that might initiate emergency calls originating in the geographic region or area served by the ESInet or PSAP, and to provide information regarding Test Call Generators, VPN access points, B2B UAs, and other facilities by which the originating network facilitates or permits Test Calls to be originated by PSAPs or ESInets. While PSAPs and ESInets may generally be aware of and have relationships with some originating networks (such as incumbent wireline and wireless network operators) serving their region, they may not be aware of other originating networks, such as over-the-top (OTT) network providers (e.g., VoIP providers). Such a registration interface allows the ESInet or PSAP to become aware of additional or all origination networks that might initiate emergency calls for callers within their service area, and to discover interfaces within such networks to arrange for Test Calls to be originated within the networks.

An originating network may also provide a Location-to-Service Translation (LoST) server, or provide information to a LoST server, to indicate that it provides emergency call origination services within a region (which might be a local area or a county, state, or country) and offers Test Call Generators, VPN access points, B2B UAs, and other facilities by which the originating network facilitates or permits Test Calls to be originated. A PSAP or service within an ESInet may use such LoST services to locate networks that might need to be included in test coverage criteria and to locate the services within such networks that facilitate or permit Test Calls to be originated within that network.

An originating network may use LoST services to locate all ESInets or PSAPs to which emergency calls that it may initiate might be delivered. This might include performing LoST queries for the "SOS" and/or "Test.SOS" services for all geographic regions or areas in which users of the originating network might be located (or might be configured as being located), and then performing web services discovery for the domains of the returned URNs; or performing LoST queries for a service registered for the discovery interface. The originating network might then use the registration facility offered by the ESInet or PSAP to register itself and any facilities it provides by which services within ESInets or PSAPs may arrange for Test Call coverage.

The terms "Location" and "Location data" may be a location value, a location reference, access network information, or similar. A location value may be in the form of a civic address, a civic area, a geospatial point, or a geospatial shape (e.g., a circle, ellipsoid, or other shape centered around a point or described by one or more points). A location reference resolves to a location value when dereferenced by an authorized entity. The location value that a location reference resolves to may be configured, and may be static or dynamic. It may be configured to resolve to a specific location value or to a random value that satisfies parameters (e.g., a civic address randomly chosen from the valid addresses on a specific street or on a campus, or within a community, or a random geospatial point within a distance of a border or within a geospatial shape). It may be configured to resolve in a certain way when used with a test emergency call and another way when used with a non-test emergency call. Access network information may include the type of attachment (as, for example, ADSL, or Universal Terrestrial Radio Access Network (UTRAN)) and/or information identifying the attachment point or location (as, for example, ADSL location information, or a UTRAN cell identifier).

Figure 7:
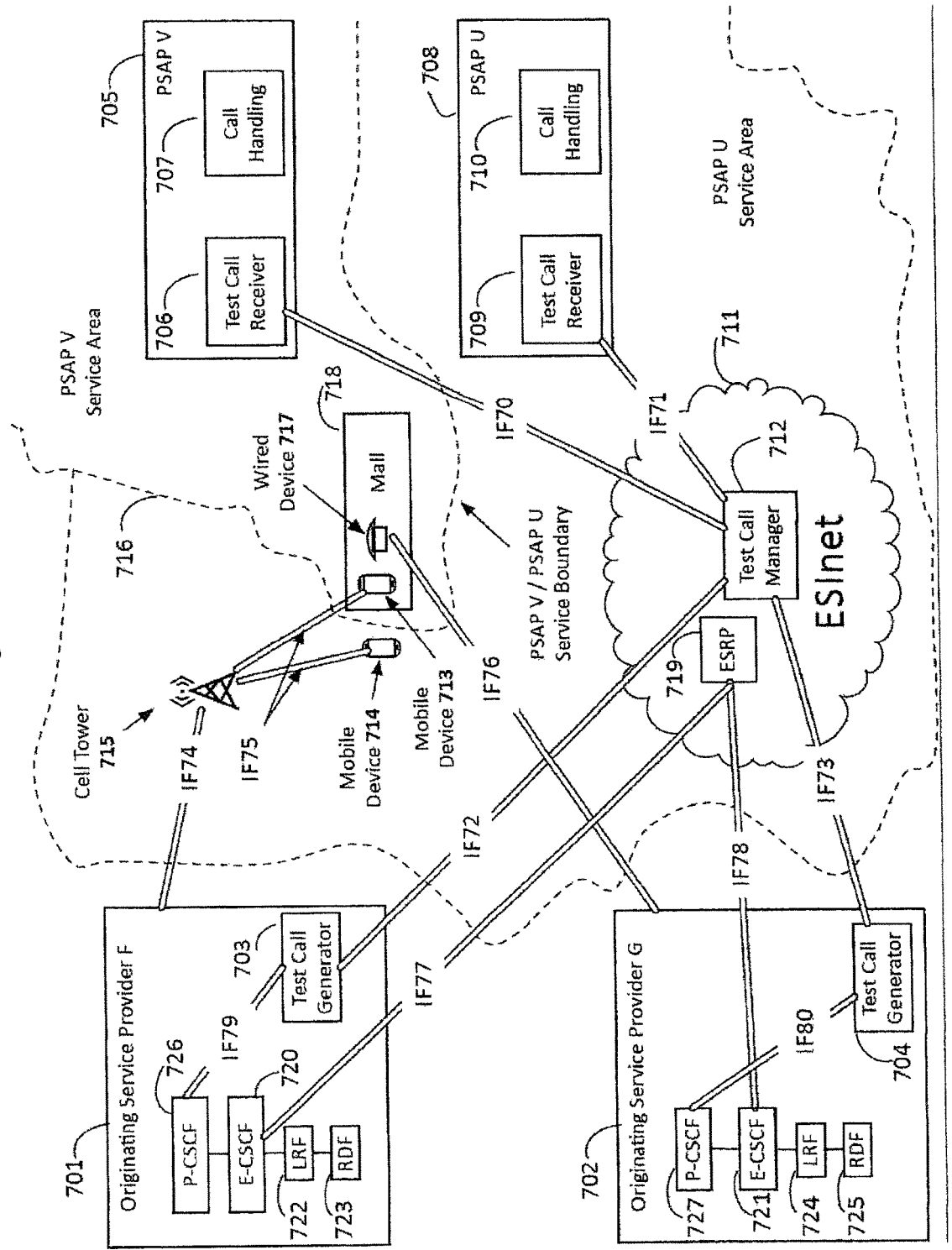
FIG. 7 illustrates another embodiment of the NG9-1-1 Test Call System where the Originating Service Provider F 701 uses a Cell Tower 715 that has a coverage area encompassing the service areas of at least PSAP V 705 and PSAP U 708.

Test Call Generators as depicted in FIG. 1 as elements 105 and 106, and in FIG. 2 as element 217 together with elements 205 and 206, and in FIG. 3 as element 316 together with element 306, and in FIG. 7 as elements 705 and 706. The Test Call Generator is a device that includes a processor and memory in electronic communication with the processor. The memory embodies instructions. The instructions are executable by the processor to perform the functions described here. A Test Call Generator may be a computer with application software. The Test Call Generator may be a computer equipped with a processor, memory, operating system, database or other persistent storage, and communications applications and communications interfaces. The Test Call Generator is typically located within an Originating Service Provider's network or otherwise embodied such that it can originate calls within an Originating Service Provider's network. Example Originating Service Provider's networks are depicted in FIG. 1 as elements 101 and 104. Test Call Generators 105 and 106 each have Test Call Profiles that are configured by a Test Call Manager 116 or Mobile Test Call Manager 100. Test Call Profiles for Test Call Generators may include (but are not limited to) the following test parameters and information:

a) Test Call Profile Identifier. This identifier is used by the Test Call Manager to synchronize the test profiles in Test Call Generators with the Test Call Profile in Test Call Responders.

b) Calling number c) Known Caller Location. This data may be configured in a Test Call Manager, Mobile Test Call Manager or may be populated with location data by calls from an Identified Mobile Device 117.

d) Determined Caller Location. This data is provided by whatever location or positioning technology is provided by the system determining the location of devices such as an Identified Mobile Device 117, Portable Wired Device 120, or Portable Wireless Device 103.

e) Access Network Info. This is data that normally identifies how a device attaches to an access network. It may, for example, identify a PLMN cell, other air interface access point identification, physical attachment point, etc. This data may be configured from known data or populated with data from a test or other device such as an Identified Mobile Device 117, Portable Wired Device 120, or Portable Wireless Device 103.

f) Test start time/date.

g) Test stop time/date.

h) The number of test calls to be made (or continuous).

i) The time between test calls (may be a fixed value or random).

j) There may be multiple entries for (g) and (h), each applicable to a time range, e.g., weekdays, weekends, workdays, holidays, winter workday morning rush hour, summer workday lunchtime, pre Christmas weekend day, etc.

k) PSAP identification of the PSAP expected to receive test calls.

l) Callback number.

m) Entities to be notified of test results, status or failure and notification methods and details.

n) Minimum and/or maximum intervals for sending Test Result Reports (e.g., no more than some number of Test Result Reports within a unit of time, and at least one Test Result Report every unit of time).

o) A database or other list or store of Identified Mobile Devices authorized to initiate test calls.

p) The limits for the total number and frequency allowed for test calls.

q) The limits for the number and frequency allowed for an individual consumer's test calls.

r) Whether or not the Test Call Profile is enabled.

s) Audio files containing messages to be sent as responses to some test calls.

t) Text files containing messages to be sent as responses to some test calls.

u) Media (audio, text, video) files containing media to be sent within some test calls.

Figure 9:
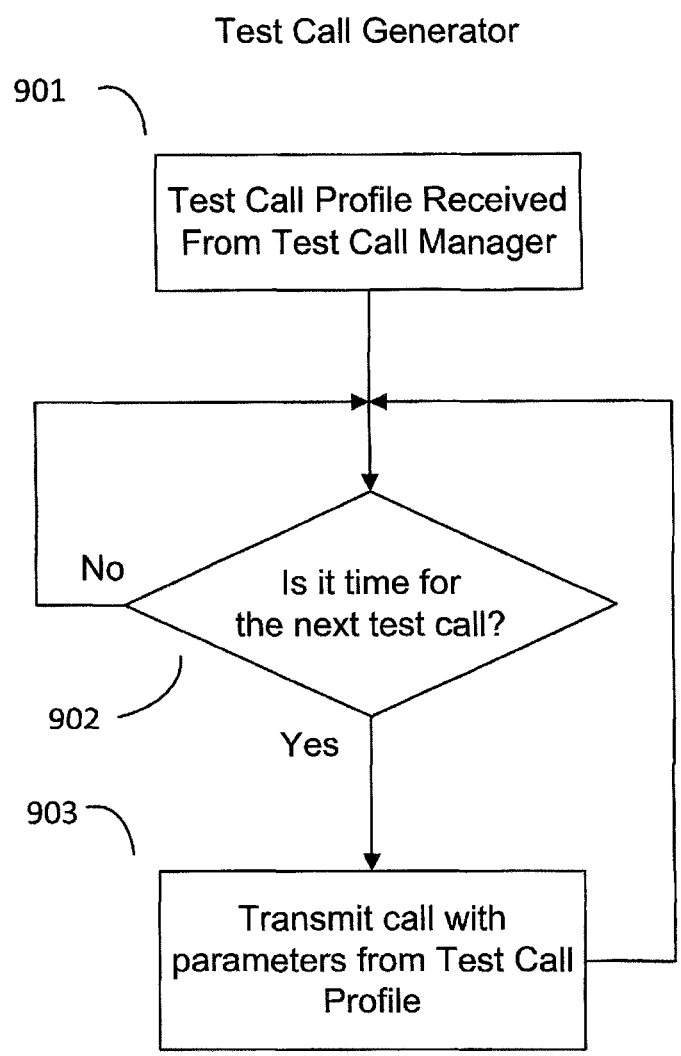
FIG. 9 is a flow chart illustrating the operation of the Test Call Generator.

FIG. 9 is a flowchart depicting the operation of the Test Call Generator in connection with Test Call profiles. As shown in step 901 a Test Call Profile is received. The Test Call Profile is stored and processing begins. The parameters of the Test Call Profile determine when a test call should be transmitted as well as the parameters included in the test call. In step 902 the current time is compared with the time required for transmission of a test call in the Test Call Profile. In the event that time has not yet arrived, the processing loops back to await that time. On the other hand, if the determination is that the time has come for the transmission of the next test call, then processing proceeds to step 903 where the next test call is transmitted with parameters taken from the Test Call Profile. While FIG. 9 only illustrates the processing which occurs in a single instance, those skilled in the art will realize that there may well be multiple similar streams of processing occurring simultaneously. This is implemented with multiple instances of similar hardware or multiple time displaced processing in the same hardware—or through the use of both techniques. As a result, the Test Call Generator transmits test calls in accordance with the Test Call Profiles which have been received in the Test Call Generator.

Test Call Responders as depicted in FIG. 1 as elements 110 and 115, and in FIG. 2 as element 210, and in FIG. 3 as element 310, and in FIG. 7 as elements 710 and 713. The Test Call Responder is a computer with application software. The Test Call Responder computer is equipped with a processor, memory, operating system, database, and communications applications and communications interfaces. Test Call Responders are located at Public Safety Answering Points (PSAPs) as depicted in FIG. 1 as elements 109 and 112, and in FIG. 2 as element 209, and in FIG. 3 as element 309, and in FIG. 7 as elements 709 and 712. Test Call Responders 110 and 115 have Test Call Profiles that are configured by a Test Call Manager 116 or Mobile Test Call Manager 100 and likewise for Test Call Responders 210, 310, 710, and 713 being configured by Test Call Managers 216, 317, and 716. Test Call Profiles for Test Call Responders 110, 115, 310, 719, and 713 may include (but are not limited to) the following test parameters and information:

a) Test Call Profile Number.
b) Test Call Generator Identification.
c) Calling number in expected test call.
d) Test start time (or immediate).
e) Test stop time (or continuous).
f) The number of test calls expected to be received (or continuous).
g) The expected caller location if known.
h) The Originating Service Provider identification.
i) The expected time between calls.
j) Entities to be notified of test results, status or failure, and notification methods and details.
k) Minimum and/or maximum intervals for sending Test Result Reports (e.g., no more than some number of Test Result Reports within a unit of time, and at least one Test Result Report every unit of time).
l) The limits for the total number and frequency allowed for the reception and processing of test calls.
m) Whether or not the Test Call Profile is enabled.
n) Audio files containing messages to be sent as responses to some test calls.
o) Text files containing messages to be sent as responses to some test calls.

Figure 10:
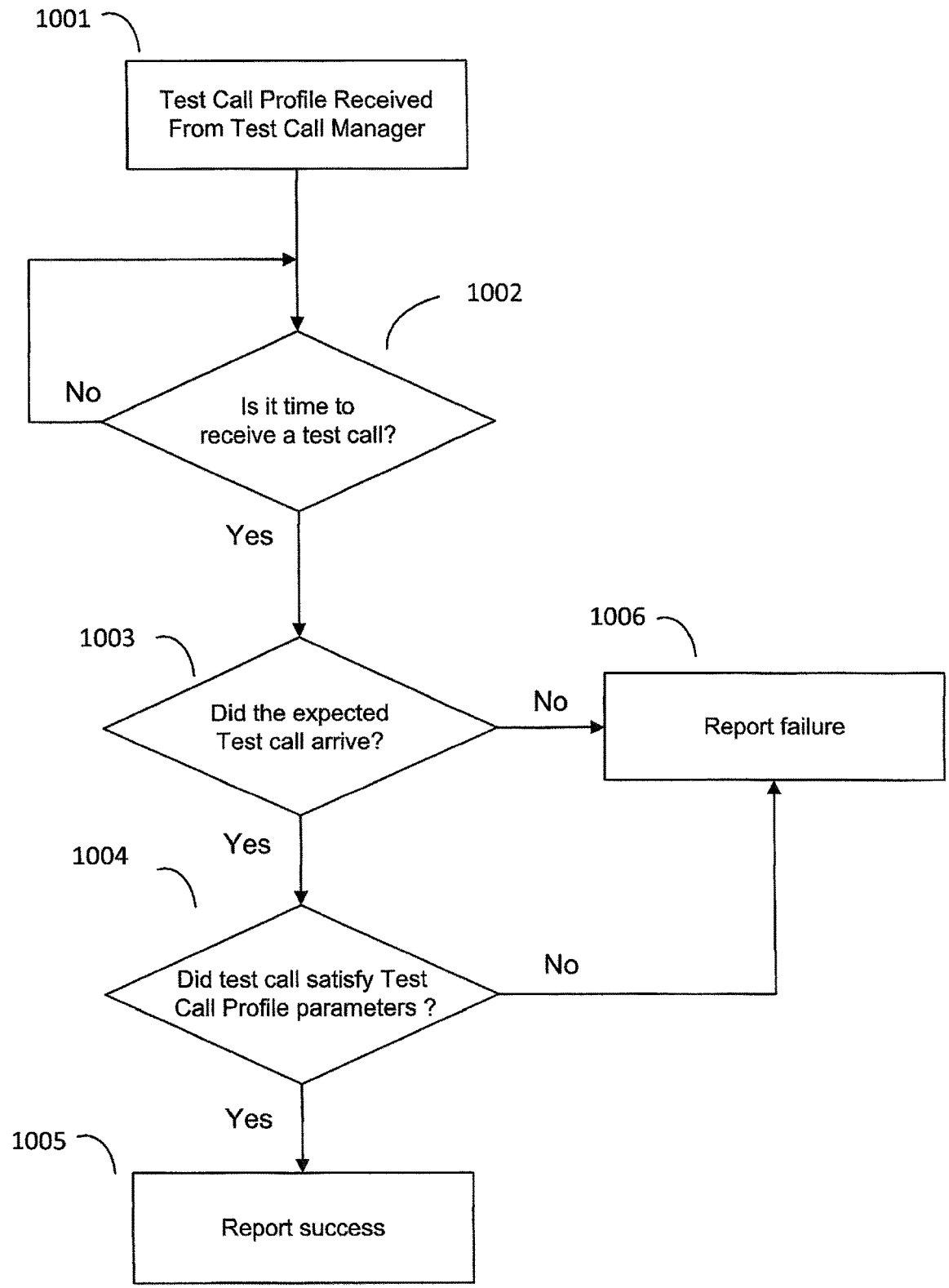
FIG. 10 is a flow chart illustrating operation of the Test Call Responder.

FIG. 10 is a flowchart depicting the operation of the Test Call Responder. As shown at step 1001 a Test Call Profile is received and stored and processing that Test Call Profile begins. The parameters of the Test Call Profile determine when a test call should be received. Step 1002 determines whether a test call should be received at the current time. If that is not the case, processing loops back to await that time. On the other hand, if a test call should be received at the current time, then processing proceeds to step 1003 to determine if the test call has been received. If that is not the case, then step 1006 initiates a report of the failure of reception. If a test call is received, then processing proceeds to step 1004 to determine if the test call which was received contained the parameters of the test call specified in the Test Call Profile. If the determination is that the proper test call parameters were not present then processing proceeds to step 1004 to report a failure. On the other hand, if the test call did contain the parameters specified in the Test Call Profile, then processing proceeds to step 1005 to report a successful test call reception. While FIG. 10 only illustrates the processing which occurs in a single instance, those skilled in the art will realize that there may well be multiple similar streams of processing occurring simultaneously. This is implemented with multiple instances of similar hardware or multiple time displaced processing in the same hardware—or through the use of both techniques. As a result, the Test Call Responder reports on the success or failure of reception of the test calls in accordance with the Test Call Profiles which have been received in the Test Call Responder. The reports are transmitted to the appropriate Test Call Manager.

Test Call Manager as depicted in FIG. 1 as element 116, and in FIG. 2 as element 216, and in FIG. 3 as element 317, and in FIG. 7 as element 716. A Test Call Manager is a device that includes a processor and memory in electronic communication with the processor. The memory embodies instructions. The instructions are executable by the processor to perform the functions described here. A Test Call Manager may be a computer with application software. A Test Call Manager may be operated by one entity on behalf of another (e.g., a hosted Test Call Manager). The Test Call Manager 116, 216, 317, or 716 may be a computer equipped with a processor, memory, operating system, database or other storage, and communications applications and communications interfaces. One or more Test Call Managers may be located anywhere there is IP network connectivity to one or more of the Test Call Generators and Test Call Responders that comprise the NG9-1-1 Test Call System. Users on a Test Call Manager can create, save, and synchronize Test Call Profiles used by Test Call Managers and/or communicated to or used to control the operations of Test Call Generators and Test Call Responders. A database or other storage on the Test Call Manager stores Test Call Profiles. In the example implementation shown in FIG. 1, the Test Call Manager 116 is connected to the Internet, depicted in FIG. 1 as element 108. It can also be connected to an ESInet, as depicted in FIG. 1 as element 107, and in FIG. 2 as element 207, and in FIG. 3 as element 307, and in FIG. 7 as element 707. The Test Call Managers 116, 216, 317, and 716 allow an authorized user to develop and manage Test Call Profiles that will be stored in Test Call Generators 105, 106, 217, 316, 705, and 706 and Test Call Responders 110, 115, 210, 310, 710, and 713. Multiple Test Call Profiles may be stored and simultaneously activated in order to simulate calls originating from multiple devices and/or from multiple locations and/or using multiple Origination Networks. Test Call Managers also collect, store, and display the status and results of test calls as determined by the Test Call Generators and Test Call Responders. Test Call Managers may establish connections to Test Call Generators and Test Call Responders within an ESInet or via an ESInet or with secure connections using the Internet.

Mobile Test Call Manager as depicted in FIG. 1 as element 100. Mobile Test Call Managers are mobile devices used for voice, text, video, data, or a combination of voice and/or other media and data communication. Mobile Test Call Managers are capable of generating 9-1-1 calls that may employ various available location determination technologies. The Mobile Test Call Manager 100 can perform the functions of a Test Call Manager and has the additional capability of configuring a Test Call Profile in a Test Call Generator 105, 106 with a caller location provided by one or more location determination technologies. A Mobile Test Call Manager is a device that includes a processor and memory in electronic communication with the processor. The memory embodies instructions. The instructions are executable by the processor to perform the functions described here. A Mobile Test Call Manager includes radio elements in communication with a wireless communication system such as a Public Land Mobile Network (PLMN), Wi-Fi AP, etc.

The other elements depicted in FIG. 1 and the roles they play in the scenarios below are:

101 Originating Service Provider A. This commercial organization provides wired (Public Switched Telephone Service) and wireless (Public Land Mobile Network) telephone service to customers. For 9-1-1 calls, it uses and provides caller information that may include location that may be from a known address of a wired device 119 or, for wireless calls, determined or estimated by using a variety of technologies including handset-based GPS and/or other GNSS, U-TDOA, Bluetooth beacons, OTDOA, NEAD, etc., and may include access network information (such as a network attachment type of UTRAN and a UTRAN cell identifier).

102 Wireless Router. For telephone devices equipped with the ability to make calls using Wi-Fi such as the Portable Wireless Device 102 in this example, the Wireless Router is the device that connects the Wi-Fi transceiver in the device to the Internet and ultimately to a service provider; which in this example is Originating Service Provider B 104.

103 Portable Wireless Device. A wireless telephone device capable of making and receiving calls on a Wi-Fi network.

104 Originating Service Provider B. This commercial organization provides wireless telephone service and Voice over Internet (VoIP) wired and wireless telephone service to customers. For 9-1-1 calls, it uses and provides caller information that may include location that may be from a known address of a wired device 119 or, for wireless calls, determined or estimated by using a variety of technologies including handset-based GPS and/or other GNSS, U-TDOA, Bluetooth beacons, OTDOA, NEAD, etc., and may include access network information (such as a network attachment type of UTRAN and a UTRAN cell identifier)

105 Test Call Generator. The Test Call Generator sends 9-1-1 test calls based on parameters stored in Test Call Profiles. The test calls are presented to the NG9-1-1 system to verify various aspects such as if they are correctly routed to the correct Public Safety Answering Point and answered there.

106 Test Call Generator. The Test Call Generator sends 9-1-1 test calls based on parameters stored in Test Call Profiles. The test calls are presented to the NG9-1-1 system to verify various aspects such as if they are correctly routed to the correct Public Safety Answering Point and answered there.

107 ESInet. An ESInet (Emergency Services IP Network) is a managed IP network that is used for emergency services communications, and which can be shared by multiple public safety agencies.

108 Internet. A system of interconnected networks that use common protocols to connect devices.

109 PSAP X. A Public Service Answering Point with people, systems, and facilities to answer 9-1-1 calls. In this example, incoming test calls at PSAP X are answered by Test Call Responder 110.

110 Test Call Responder. The Test Call Responder answers and acknowledges incoming 9-1-1 test calls, performs other tests (such as test call-backs), etc.

111 Call Handling Functional Element. The Call Handling Functional Element that answers 9-1-1 calls. In this example, the Call Handling Functional Element at PSAP X answers normal 9-1-1 calls but does not necessarily answer 9-1-1 Test Calls.

112 PSAP Y. A Public Service Answering Point with people, systems, and facilities to answer 9-1-1 calls. In this example, all incoming calls, including test calls, at PSAP Y are answered by a Call Handling Functional Element 114. The Test Call Responder 115 monitors the Test Calls and acknowledgments by using a Tap or SPAN port that passively directs call data to the Test Call Responder 115.

113 Tap or SPAN Port. An Ethernet tap or SPAN port on an Ethernet switch that allows data to be directed to a monitoring device, in this example, to a Test Call Responder 115.

114 Call Handling Functional Element. The Call Handling Functional Element answers 9-1-1 calls. In this example, the Call Handling Functional Element at PSAP Y answers 9-1-1 Test Calls as well as normal 9-1-1 calls.

115 Test Call Responder. The Test Call Responder 115 in this example monitors the answering and acknowledgment of 9-1-1 test calls by the Call Handling Functional Element 114.

116 Test Call Manager. The Test Call Manager 116 is the element that provides the methods for an authorized user to develop and maintain Test Call Profiles that will be stored in Test Call Generators 105, 106 and may be stored in Test Call Responders 110 and 115.

117 Identified Mobile Device. An Identified Mobile Device 117 is any mobile wireless telephone device that has its identity registered with the Originating Service Provider A 101 as a device authorized to interface with a Test Call Generator 105 for the purpose of generating a test call, e.g., with the Determined Caller Location.

118 Mobile Device. The Mobile Device 118 represents a mobile wireless telephone device capable of generating a 9-1-1 call. The network access information (e.g., the type of air interface and identity of the radio cell site currently used by Mobile Device 118) may be used by Originating Service Provider B 104 to route a 9-1-1 call to an ESInet 107 using the Interface IF5 in FIG. 1 and may be provided or made available to the PSAP. The caller location or location estimate of the device may be determined by one of the available technologies and it and/or the device's network attachment information (e.g., PLMN wireless access and a PLMN cell identifier) may be used to determine routing towards a PSAP and/or provided with the call or made available to services within the ESInet 107 and PSAP during the call.

119 Standard Wired Device. The Standard Wired Device 119 depicted in FIG. 1. is a public switched network telephone connected to the Originating Service Provider A 101 using Interface IF1. The caller location of the Standard Wired Device is stored in an Originating Service Provider database or other storage (e.g., a wiremap database) and delivered or made available by the Originating Service Provider A 101 to the PSAP and services within ESInet 107 using the Interface IF3 in FIG. 1.

120 Portable Wired Device. The Portable Wired Device 120 depicted in FIG. 1. is a VoIP (Voice over Internet Protocol) device capable of making telephone calls using an IP interface (IF8) through the Internet to the Originating Service Provider B 104. The caller location of the Portable Wired Device 120 is determined by the Originating Service Provider and delivered by the Originating Service Provider B 104 to the PSAP and services within ESInet 107 using the Interface IF5 in FIG. 1

The Interfaces, which may or may not be VPN (Virtual Private Network) interfaces depicted in FIG. 1 and the roles they play in the scenarios below are:

IF2 An IP (Internet Protocol) Interface between the ESInet 107 and a Test Call Responder 110.

IF3 An IP (Internet Protocol) Interface between the ESInet 107 and a Test Call Generator 105.

IF4 An IP (Internet Protocol) Interface between the Internet 108 and a Test Call Generator 105.

IF5 An IP (Internet Protocol) Interface between the ESInet 107 and a Test Call Generator 106.

IF6 An IP (Internet Protocol) Interface between the Internet 108 and a Test Call Generator 106.

IF7 An IP (Internet Protocol) Interface between the Internet 108 and Originating Service Provider B 104.

IF8 An IP (Internet Protocol) Interface between the Internet 108 and a Portable Wired Device 120.

IF9 An IP (Internet Protocol) Interface between the Internet 108 and a Wireless Router 102.

IF10 An IP (Internet Protocol) Interface between the Internet 108 and a Test Call Manager 116.

IF11 An IP (Internet Protocol) Interface between the ESInet 107 and a Test Call Manager 116.

IF12 An IP (Internet Protocol) Interface between the Internet 108 and a Test Call Responder 115.

IF13 An IP (Internet Protocol) Interface between the ESInet 107 and a Tap or Span Port 113.

IF14 An IP (Internet Protocol) Interface between the Internet 108 and a Test Call Responder 110.

FIG. 2 depicts a Test Call System where a Test Call Manager 216 is located within an ESInet 207 (and may serve multiple PSAPs). Also depicted is a Test Call Generator 217 that is deployed in a configuration that splits its functionality: the core elements including Test Call Profile storage and execution are deployed within the same ESInet 207 as the Test Call Manager 216, initiating signaling through a VPN Access Point 205 located within the network of Originating Service Provider C 201, and also via a SIP Back-to-Back User Agent 206 located within the network of Originating Service Provider D 204. This example deployment allows Originating Service Provider C 201 and Originating Service Provider D 204 to facilitate automatic testing and verification of the end-to-end emergency call system by permitting Test Call Generator 217 to initiate test calls that appear to originate within their respective networks, in a manner that reduces the cost and complexity burden of the two Originating Service Providers.

The elements depicted in FIG. 2 and the roles they play in the scenarios below are:

201 Originating Service Provider C. This commercial organization may provide wired (Public Switched Telephone Service), wireless (Public Land Mobile Network), Voice over Internet Protocol (VoIP), or another telephone service to customers. For 9-1-1 calls, it uses and provides caller information including location that may be from a known address of a wired device or, for wireless calls, determined or estimated by using a variety of technologies including GPS and/or other GNSS, U-TDOA, Bluetooth beacons, OTDOA, NEAD, etc., and may include access network information (e.g., the type of air interface and identity of the radio cell currently used by a PLMN wireless device.

204 Originating Service Provider D. This commercial organization may provide wired (Public Switched Telephone Service), wireless (Public Land Mobile Network), Voice over Internet Protocol (VoIP), or another telephone service to customers. For 9-1-1 calls, it uses and provides caller information including location that may be from a known address of a wired device or, for wireless calls, determined or estimated by using a variety of technologies including GPS and/or other GNSS, U-TDOA, Bluetooth beacons, OTDOA, NEAD, etc., and may include access network information (e.g., the type of air interface and identity of the radio cell currently used by a PLMN wireless device).

205 VPN Access Point. This element anchors Interface IF22 and allows Test Call Generator 217 to initiate test calls that appear to originate within Originating Service Provider C 201.

206 SIP B2B UA. This element is a Session Initiation Protocol Back-to-Back User Agent. It anchors Interface IF23 and allows Test Call Generator 217 to initiate test calls that appear to originate within Originating Service Provider D 204.

207 ESInet. An ESInet (Emergency Services IP Network) is a managed IP network that is used for emergency services communications, and which can be shared by multiple public safety agencies.

209 PSAP Z. A Public Service Answering Point with people, systems, and facilities to answer 9-1-1 calls. In this example, incoming test calls at PSAP Z are answered by Test Call Responder 210.

210 Test Call Responder. The Test Call Responder answers and acknowledges incoming 9-1-1 test calls, performs other tests (such as test call-backs), etc.

211 Call Handling Functional Element. The Call Handling Functional Element that answers 9-1-1 calls. In this example, the Call Handling Functional Element at PSAP Z answers normal 9-1-1 calls but does not necessarily answer 9-1-1 Test Calls.

216 Test Call Manager. The Test Call Manager 216 is the element that provides the methods for an authorized user to develop and manage Test Call Profiles that will be stored in Test Call Generator 217 and may be stored in Test Call Responder 210. In this example, Test Call Manager 216 is located within ESInet 207 and may serve multiple PSAPs.

217 Test Call Generator. The Test Call Generator initiates 9-1-1 test calls based on parameters stored in Test Call Profiles. The test calls are presented to the NG9-1-1 system to verify various aspects such as if they are correctly routed to the correct Public Safety Answering Point and answered there, if media flow in both directions through the call, etc.

The Interfaces, which may or may not be VPN (Virtual Private Network) interfaces depicted in FIG. 2 and the roles they play in the scenarios below are:

IF20 An interface between the ESInet 207 and Test Call Responder 210.

IF21 An IP (Internet Protocol) interface between a Test Call Manager 216 and a Test Call Generator 217.

IF22 An interface between a Test Call Generator 217 and a VPN access point 205 within Originating Service Provider C 201.

IF23 An interface between a Test Call Generator 217 and a SIP B2B UA 206 within Originating Service Provider D 204.

FIG. 3 depicts a Test Call System deployment in which an Originating Service Provider E 301 deploys a Proxy Call Session Control Function (P-CSCF) 302, an Emergency Call Session Control Function (E-CSCF) 303, a Location Determination Function (LRF) 304, a Route Determination Function (RDF) 305, and a SIP Back-to-Back User Agent (SIP B2B UA) 306. The SIP B2B UA 306 permits Test Call Generator 316 to initiate test calls that appear to originate from the network of Originating Service Provider E 301. The E-CSCF 303 might use the method depicted in FIG. 4 to choose the location and/or access network information to use for routing a call towards a PSAP. The LRF 304 may use similar steps to determine that it should provide as the location for dispatch the location information provided with the test call.

The elements depicted in FIG. 3 and the roles they play in the scenarios below are:

300 Mobile Device. The Mobile Device 300 represents a mobile wireless telephone device capable of generating a 9-1-1 call communicating with Originating Service Provider E 301 using Interface IF30. The network access information (e.g., the type of air interface and identity of the radio cell currently used by Mobile Device 300) may be used by Originating Service Provider E 301 to route a 9-1-1 call to an ESInet 307 using the Interface IF35 in FIG. 3 and may be provided or made available to the PSAP. The caller location or location estimate of the device may be determined by one of the available technologies, and it and/or the device's network attachment information (e.g., a PLMN radio network and a PLMN cell identifier) may be used to determine the route towards the PSAP, and/or may be provided with the call or made available to the ESInet and PSAP during the call.

301 Originating Service Provider A. This commercial organization provides wired (Public Switched Telephone Service) and wireless (Public Land Mobile Network) telephone service to customers. For 9-1-1 calls, it provides caller information that may include location that may be from a known address of a wired device 319 or, for wireless calls, estimated or determined by using a variety of technologies such as handset-based GPS and/or other GNSS, U-TDOA, Bluetooth beacons, OTDOA, NEAD, etc., and may include access network information (e.g., the type of air interface and identity of a PLMN wireless cell currently used by a PLMN wireless device).

302 Proxy Call Session Control Function (P-CSCF), a functional element within Originating Service Provider A 301 that acts as the primary proxy for all calls (including emergency, nonemergency, and test) initiated by any device connected to Originating Service Provider A 301 including Mobile Device 300 and Wireless Device 319. It also accepts test calls initiated by Test Call Generator 316 via SIP B2B UA 306 over interface IF34. In this example, P-CSCF 302 forwards emergency and test emergency calls to Emergency Call Session Control Function (E-CSCF) 303.

303 Emergency Call Session Control Function (E-CSCF), a functional element within Originating Service Provider A 301 that in this example handles all emergency and test emergency calls initiated by any device connected to Originating Service Provider A 301 including Mobile Device 300, Wired Device 319, and Test Call Generator 316 via SIP B2B UA 306. In this example, E-CSCF 302 may consult Location Retrieval Function (LRF) 304 to determine the correct routing and/or to obtain location information (as a location value or a location reference) to supply with the test call initiation request. An E-CSCF 303 may determine that a test call contains location and/or access network information and has been initiated by a Test Call Generator 316 or initiated via B2B UA 306 or contains a Test Info block 504 signed by an authorized entity (e.g., with credentials traceable to a PSAP Credential Authority (PCA)).

304 Location Retrieval Function (LRF) determines or associates a location with a call and in this example also a test emergency call. This location may be a stored or associated location of a wired device such as Wired Device 319, or a determined or approximate location of a device such as Mobile Device 300, or a course location for routing, or may be a configured, pre-determined or associated location for routing for a wireless device such as Mobile Device 300, or a location supplied with a test call. An LRF 304 may use location or access network information supplied with a test call by an authorized entity such as a Test Call Generator 316, for example if an LRF 304 or an E-CSCF 303 determines that the test call has been initiated by a Test Call Generator 316 or initiated via B2B UA 306 or contains a Test Info block 504 signed by an authorized entity (e.g., with credentials traceable to a PSAP Credential Authority (PCA)). An LRF 304 may also supply an E-CSCF 303 with the determined routing for such calls based on location or access network information; in this example a route towards Emergency Services Routing Proxy (ESRP) 318 within ESInet 307 via interface IF35. An LRF 304 in this example may consult Routing Determination Function (RDF) 305 to determine the route. An LRF 304 may also supply an E-CSCF 303 with location information (a location value or a location reference) that will be supplied with the test call initiation request. An LRF 304 may respond to location deference requests for a location for dispatch by returning a location value that was supplied with a test call initiation request; e.g., if LRF 304 determines that a test call contains location information and has been initiated by a Test Call Generator 316 or initiated via B2B UA 306 or contains a Test Info block 504 signed by an authorized entity (e.g., with credentials traceable to a PSAP Credential Authority (PCA)).

305 Routing Determination Function (RDF) determines the correct routing for emergency calls, and in this example test emergency calls, based on the location and/or access network information associated with the call. This information may be a stored or associated location of a wired device, or an access point used by a wired device, such as Wired Device 319. This information may be a determined or approximate location of a device such as Mobile Device 300, or may be course location for routing or a location for routing associated with access network information of (e.g., an identity of or location information or a configured, pre-determined or associated location for routing associated with a PLMN cell currently used by) a wireless device such as Mobile Device 300. It may be a location value supplied with a test call by Test Call Generator 316, or a location value obtained by dereferencing a location reference supplied with a test call by Test Call Generator 316, and/or a configured, pre-determined or associated location for routing associated with access network information supplied with a test call by Test Call Generator 316. An RDF 305 in this example determines the route towards Emergency Services Routing Proxy (ESRP) 318 within ESInet 307 via interface IF35.306 SIP B2B UA. This element is a Session Initiation Protocol Back-to-Back User Agent. It anchors Interface IF34 and allows Test Call Generator 316 to initiate test calls that appear to originate within Originating Service Provider E 301.

307 ESInet. An ESInet (Emergency Services IP Network) is a managed IP network that is used for emergency services communications, and which can be shared by multiple public safety agencies.

309 PSAP W. A Public Service Answering Point with people, systems, and facilities to answer 9-1-1 calls. In this example, incoming test calls at PSAP W are answered by Test Call Responder 310.

310 Test Call Responder. The Test Call Responder answers and acknowledges incoming 9-1-1 test calls, performs other tests (such as test call-backs), etc.

311 Call Handling Functional Element. The Call Handling Functional Element that answers 9-1-1 calls. In this example, the Call Handling Functional Element at PSAP W answers normal 9-1-1 calls but does not necessarily answer 9-1-1 Test Calls.

316 Test Call Generator. The Test Call Generator sends 9-1-1 test calls based on parameters stored in Test Call Profiles. The test calls are presented to the NG9-1-1 system to verify various aspects such as if they are correctly routed to the correct Public Safety Answering Point and answered there.

317 Test Call Manager. The Test Call Manager 317 is the element that provides the methods for an authorized user to develop Test Call Profiles that will be stored in Test Call Generator 316 and Test Call Responder 310. 318 Emergency Services Routing Proxy (ESRP) is a functional element within an ESInet 307 to which calls are routed. Entities outside an ESInet 307 do not have visibility within an ESInet 307 and thus route all calls for ESInet 307 to an ESRP 318. Since an ESRP 318 is within an ESInet 307, it is able to route to specific entities such as a PSAP W 309.

319 Standard Wired Device. The Standard Wired Device 319 depicted in FIG. 3. is a public switched network telephone device connected to the Originating Service Provider E 301 using Interface IF31. The caller location of the Standard Wired Device is stored in an Originating Service Provider database or other storage (e.g., a wiremap database) and delivered by the Originating Service Provider 3 301 to the ESInet 307 using the Interface IF35 in FIG. 3.

The Interfaces, which may or may not be VPN (Virtual Private Network) interfaces depicted in FIG. 3, and the roles they play in the scenarios below are:

IF30 An interface between mobile devices such as Mobile Device 300 and a P-CSCF 302. IF30 allows mobile devices such as Mobile Device 300 to initiate any type of call.

IF31 An interface between wired devices such as Standard Wired Device 319 and a P-CSCF 302. IF31 allows such devices to initiate any type of call.

IF32 An interface between an ESInet 307 or a Test Call Manager 317 within an ESInet 307 and a Test Call Responder 310 within a PSAP W 309.

IF33 An interface between a Test Call Manager 317 and a Test Call Generator 316.

IF34 An interface between a Test Call Generator 316 and a SIP B2B UA 306 within an Originating Service Provider E 301 that permits Test Call Generator 316 to initiate test calls that appear to originate within Originating Service Provider E 301.

IF35 An interface between an E-CSCF 303 and an ESRP 318 that permits Originating Service Provider E 301 to present calls to ESInet 307.

FIG. 4 is a flowchart of an exemplary method of choosing the location to use for routing a call towards a PSAP. It contains the following elements:

401 tests if the call is a test emergency call (e.g., it requests a service URN of or starting with "service:test-.SOS").

402 tests if the call contains a Test Info data object (e.g., element 504 in FIG. 5).

403 tests if the call is from an authorized entity, for example, the Test Info data block is digitally signed by an authorized entity (e.g., using credentials traceable to the PSAP Credential Authority (PCA)), or the call was received from or routed via a trusted entity (e.g., a Test Call Generator 105 or 217 or 316, or VPN access point 205, or SIP B2B UA 206 or 306).

404 tests if the call contains location information (e.g., a SIP Geolocation header field referencing a PIDF-LO data object in the body, or referencing a location URN), or access network information (e.g., the network attachment type, and the identity of the network attachment point, for example, a network attachment type of 802.11g (Wi-Fi) and the identification information of the 802.11g AP, or a network attachment type of ADSL and information about the DSL connection, or a network attachment of Universal Terrestrial Radio Access Network (UTRAN) and information identifying the cell site).

405 is performed if tests 401-404 are all true; the route towards the PSAP is determined using the location and/or access network information supplied with the call.

406 is performed if any of tests 401-404 are false; route determination and/or location determination and/or validation are performed as usual.

FIG. 5 illustrates an exemplary message that requests the establishment of a test emergency session (that is, it requests setting up a test emergency call) using the SIP protocol. The message contains a SIP Call-Info header field 501 that indicates that the message contains a Test Info data block, and a digitally signed body part 504 that is marked with a Content-ID MIME header field 502 referenced in the Call-Info SIP header field 501. The digitally signed body part 504 contains a body part 503 identified as an application/TestEmergencyCall.Info+xml type and also marked with a Content-ID header field referenced in the Call-Info SIP header field 501, thus indicating that it is the Test Info data block listed in the Call-Info SIP header field 501. This Test Info data block contains an identifier 505 indicating the source of the test call (such as a Test Call Generator) and the Test Call Profile at that source that caused this test call to be initiated. This allows the entity receiving the test call (such as a Test Call Responder) to trace the source of the test call, to record the fact that call was successfully received at the intended PSAP or was erroneously received at an unintended destination, and/or to inform the source of the call (such as a Test Call Generator) of the outcome of the call. It also allows the entity receiving the calls to request the source to stop generating further calls identified with the same Test Call Profile. This may be especially helpful in the event that test calls are being generated too frequently and/or are being delivered to an incorrect entity. This example Test Info data block also contains a request 506 for a test call-back that contains a URN in the form of a "tel" URI to which the test call-back is to be directed.

The elements depicted in FIG. 5 and the roles they play in the scenarios below are:

501 is a Call-Info SIP header field indicating that a Test Info data block is attached as a body part with a MIME media subtype containing TestEmergencyCall.Info and with an identifier of 1234567890@atlanta.example.com.

502 is the identifier of the digital signature wrapper body part 504. It has a value of 1234567890@atlanta.example-.com, matching the reference in element 501, indicating that the referenced body part is located within this multipart body part.

503 is the identifier of body part 505. It has a value of 1234567890@atlanta.example.com, matching the reference in element 501, indicating that this body part is the one referenced by 501.

504 is a digital signature wrapper multipart body part. It contains an enclosed body part 505 and a digital signature.

505 is a body part of type application/TestEmergencyCall.Info+xml that is contained inside the digital signature wrapper body part 504. It has an identifier with the value 1234567890@atlanta.example.com, matching the reference in element 501, indicating that this body part is the one referenced by 501.

506 is an XML data element within the example TestEmergencyCall.Info XML data object contained within the application/TestEmergencyCall.Info+xml body part 505. It requests a test call-back to telephone number+10005551212.

507 is a SIP header field containing access network information supplied by a Test Call Generator. It indicates that the routing towards a PSAP should proceed as if the call was initiated by a PLMN wireless device currently attached to an originating service provider using a PLMN cell (attachment type E-UTRAN-FDD) with the identifier OFEOBADBEEF.

508 is an XML data element within the example TestEmergencyCall.Info XML data object contained within the application/TestEmergencyCall.Info+xml body part 505. It contains location information (a PIDF-LO in this example) supplied by a Test Call Generator. It indicates that the call should proceed as if originated by a device with the supplied location information.

509 is an XML data element within the example TestEmergencyCall.Info XML data object contained within the application/TestEmergencyCall.Info+xml body part 505. It contains access network information supplied by a Test Call Generator. It indicates that the routing towards a PSAP should proceed as if the call was initiated by a PLMN wireless device currently attached to an originating service provider using a PLMN cell (attachment type E-UTRAN-FDD) with the identifier OFEOBADBEEF.

510 is a body part of type application/pidf+xml with an identifier of target123@example.com, matching the reference in 512, indicating this is the location information referenced by 512. It contains location information (a PIDF-LO in this example) supplied by a Test Call Generator. It indicates that the call should proceed as if originated by a device with the supplied location information.

511 is an XML data element within the example TestEmergencyCall.Info XML data object contained within the application/TestEmergencyCall.Info+xml body part 505. It contains information allowing the test call to be traced to the Test Call Generator and Test Call Profile that caused it to be initiated, supplies interface information for the Test Call Generator, and indicates the PSAP expected to receive the call.

512 is a set of two SIP header fields that indicate that location information is supplied in a body part with the identifier target123@example.com, matching that of body part 510, and allowing the location information to be used to determine the routing.

FIG. 6 illustrates an exemplary message that responds to the request message illustrated in FIG. 5. This example message is a SIP final response message that contains the SIP status code 200 OK, indicating that the request to establish a session has been accepted. The message contains a SIP Call-Info header field 601 that indicates that the message contains a Test Info data block, and a body part 603 identified as an application/restEmergencyCall.Info+xml type and also marked with a Content-ID header field referenced in the Call-Info SIP header field 601, thus indicating that it is the Test Info data block listed in the Call-Info SIP header field 601. This Test Info data block contains identifying information 604 copied from the Test Info data block of the request that indicates the source of the test call (such as a Test Call Generator) and the Test Call Profile at that source that caused this test call to be initiated. This example Test Info data block contains a data element 606 that identifies the type and ID of the entity that handled the test call (in this example, a PSAP with the registered ID "EXAMP9"). This allows the initiator of the test call (such as a Test Call Generator) to verify if the call was handled by the intended entity. This example Test Info data block also contains the location information 605 available from the request (e.g., present in the body of the SIP request and referenced by a CID URN in the SIP Geolocation header field of the SIP INVITE, or dereferenced via a URL in the SIP Geolocation header field of the SIP INVITE), which allows the initiator of the test call (such as a Test Call Generator) to compare the location as received by the entity that handled the test call to the intended location of the test call. This example Test Info data block also contains a data element 607 that indicates the result of a request (such as request 506 in FIG. 5) for a test call-back; in this example, the test call-back succeeded with a SIP status code of 200; the result also includes the URN to which the call-back was directed. The example also shows a text/plain body part 608 as discussed in RFC 6881.

FIG. 7 illustrates a scenario where two PSAPs (PSAP V 705 and PSAP U 708) share a border 716 between their respective service areas. A shopping Mall 718 or other venue is within the service area of PSAP V 705; mobile calls from wireless devices located within Mall 718 may be served by Cell Tower 715 that is located in the service area of PSAP U 708. Policy-based routing rules may exist that direct wireless calls handled via Cell Tower 715 and routed using course location routing (e.g., using a location associated for routing with the serving cell site/sector) to PSAP V 705 during normal opening hours of Mall 718, or perhaps during typical peak busy hours of Mall 718, and to PSAP U 708 during other times. When more precise location is available during call routing, calls may be routed based on the more precise location of the device making the call. Wireless Device 713 is located within Mall 718, while Wireless Device 714 happens to be located close to Wireless Device 713 yet inside the service boundary of PSAP U 708. Correct operation of the 9-1-1 system would accurately process the policy based routing rules and route emergency calls initiated by the two wireless devices to either PSAP V 705 or PSAP U 708. Also located within Mall 718 is wired device 717, connected to Originating Service Provider G 702 via interface IF76.

The elements depicted in FIG. 7 and the roles they play in the scenarios below are:

701 Originating Service Provider F. This commercial organization provides wired (Public Switched Telephone Service) and wireless (Public Land Mobile Network) telephone service to customers. For 9-1-1 calls, it provides caller information that may include location that may be from a known address of a wired device or, for wireless calls, determined or estimated by using various technologies such as handset-based GPS and/or other GNSS, U-TDOA, Bluetooth beacons, OTDOA, NEAD, etc., and may include access network information (e.g., the type of air interface and identity of a PLMN wireless cell currently used by a PLMN wireless device). In this example, Originating Service Provider F 701 uses a wireless cell tower 715 (connected via interface IF74) that is in communication with Mobile Devices 713 and 714 via interface IF75 (which might, for example, be a 3GPP IMS-compatible air interface).

702 Originating Service Provider G. This commercial organization provides wired (Public Switched Telephone Service) and wireless (Public Land Mobile Network) telephone service to customers. For 9-1-1 calls, it provides caller information that may include location that may be from a known address of a wired device or, for wireless calls, determined or estimated by using various technologies such as handset-based GPS and/or other GNSS, U-TDOA, Bluetooth beacons, OTDOA, NEAD, etc., and may include access network information (e.g., the type of air or wired interface and identity of a PLMN wireless cell or physical access identification or location currently used by a PLMN wireless or a wired device).

703 Test Call Generator. The Test Call Generator initiates 9-1-1 test calls based on parameters stored in Test Call Profiles. The test calls originate within Originating Service Provider F 701. The test calls are presented to the NG9-1-1 system to verify various aspects such as if they are correctly routed to the correct Public Safety Answering Point and answered there, if media can be transmitted in both directions within the call, etc. Test Call Generator 703 may contain Test Call Profiles indicating that, for example, test calls should be initiated that are treated as if initiated by a device (such as Mobile Device 713) located within Mall 718 placing calls with Originating Service Provider F 701 via interface IF75 (to Cell Tower 715). Test Call Generator 703 may also contain Test Call Profiles indicating that, for example, test calls should be initiated that are treated as if initiated by a device (such as Mobile Device 714) located within the service area of PSAP U 708, placing calls with Originating Service Provider F 701 via interface IF75 (to Cell Tower 715).

704 Test Call Generator. The Test Call Generator initiates 9-1-1 test calls based on parameters stored in Test Call Profiles. The test calls originate within Originating Service Provider G 702. The test calls are presented to the NG9-1-1 system to verify various aspects such as if they are correctly routed to the correct Public Safety Answering Point and answered there and that media can be exchanged in both directions during the call. Test Call Generator 704 may contain Test Call Profiles indicating that, for example, test calls should be initiated that are treated as if initiated by a device (such as Wired Device 717) located within Mall 718 placing calls with Originating Service Provider G 702 via interface IF76.

705 PSAP V. A Public Service Answering Point with people, systems, and facilities to answer 9-1-1 calls. In this example, incoming test calls at PSAP V are answered by a Test Call Responder 706.

706 Test Call Responder. The Test Call Responder answers and acknowledges incoming 9-1-1 test calls received at PSAP V 705, performs other tests (such as test call-backs), etc.

707 Call Handling Functional Element. The Call Handling Functional Element that answers 9-1-1 calls received at PSAP V 705. In this example, the Call Handling Functional Element 707 at PSAP V 705 answers normal 9-1-1 calls but does not necessarily answer 9-1-1 Test Calls.

708 PSAP U. A Public Service Answering Point with people, systems, and facilities to answer 9-1-1 calls. In this example, incoming test calls at PSAP U are answered by a Test Call Responder 709.

709 Test Call Responder. The Test Call Responder answers and acknowledges incoming 9-1-1 test calls received at PSAP U 708, performs other tests (such as test call-backs), etc.

710 Call Handling Functional Element. The Call Handling Functional Element that answers 9-1-1 calls received at PSAP U 708. In this example, the Call Handling Functional Element at PSAP U answers normal 9-1-1 calls but does not necessarily answer 9-1-1 Test Calls.

711 ESInet. An ESInet (Emergency Services IP Network) is a managed IP network that is used for emergency services communications, and which can be shared by multiple public safety agencies. In this example, both PSAP V 705 and PSAP U 708 are connected to ESInet 711. Other PSAPs and emergency services agencies that are not shown may also share ESInet 711.

712 Test Call Manager. The Test Call Manager 712 is the element that provides the methods for an authorized user to develop and maintain Test Call Profiles that will be stored in Test Call Generators 703 and 704 and may be stored in Test Call Responders 706 and 709. Test Call Manager 712 may contain Test Call Profiles indicating that, for example, test calls should be initiated that are treated as if initiated by a device (such as Mobile Device 713) located within Mall 718 placing calls with Originating Service Provider F 701 via interface IF75 (to Cell Tower 715). Test Call Manager 712 may contain Test Call Profiles indicating that, for example, test calls should be initiated that are treated as if initiated by a device (such as Mobile Device 714) located within the service area of PSAP U 708, placing calls with Originating Service Provider F 701 via interface IF75 (to Cell Tower 715). Test Call Manager 712 may contain Test Call Profiles indicating that, for example, test calls should be initiated that are treated as if initiated by a device (such as Wired Device 717) located within Mall 718 placing calls with Originating Service Provider G 702 via interface IF76.

713 Mobile Device. Mobile Device 713 is a PLMN device located within Mall 718 (within the service boundary of PSAP V 705) and in communication with Originating Service Provider F 701 via Cell Tower 715 over interface IF75. In addition to interface IF75 (which might, for example, be LTE), Mobile Device 713 may also be capable of Wi-Fi, Bluetooth, and other communication technologies, and may be capable of receiving GNSS signals from one or more constellations such as GPS. Mobile Device 713 is capable of generating a 9-1-1 call. The network access information (e.g., the type of air interface and identity of Cell Tower 715 used by Mobile Device 713) may be used by Originating Service Provider F 701 (e.g., by E-CSCF 720 and/or LRF 722 and/or RDF 723) to route a 9-1-1 call to an ESRP 719 in ESInet 711 using the Interface IF77 in FIG. 7 and may be provided or made available to the PSAP. The caller location or location estimate of the device may be determined by one of the available technologies, and it and/or the device's network attachment information (e.g., the radio type and identification of Cell Tower 715) may be used to determine the route towards the PSAP (e.g., a URN for ESRP 719), and/or may be provided with the call or made available to services within ESInet 711 and the PSAP during the call.

714 Mobile Device. Mobile Device 714 is a PLMN device located within the service boundary of PSAP U 708 and in communication with Originating Service Provider F 701 via Cell Tower 715 over interface IF75. In addition to interface IF75 (which might, for example, be LTE), Mobile Device 714 may also be capable of Wi-Fi, Bluetooth, and other communication technologies, and may be capable of receiving GNSS signals from one or more constellations such as GPS. Mobile Device 714 is capable of generating a 9-1-1 call. The network access information (e.g., the type of air interface and identity of the Cell Tower 715 currently used by Mobile Device 714) may be used by Originating Service Provider F 701 (e.g., by E-CSCF 720 and/or LRF 722 and/or RDF 723) to route a 9-1-1 call to an ESRP 719 in ESInet 711 using the Interface IF77 in FIG. 7 and may be provided or made available to the PSAP. The caller location or location estimate of the device may be determined by one of the available technologies, and it and/or the device's network attachment information (e.g., the radio type and identification of Cell Tower 715) may be used to determine the route towards the PSAP (e.g., a URN for ESRP 719), and/or may be provided with the call or made available to services within ESInet 711 and the PSAP during the call.

715 Cell Tower. Cell Tower 715 is a PLMN communications facility operated by Originating Service Provider F 701. Commonly referred to as a "cell" or "cell tower" or "cell site" (or "cell site/sector"), Cell Tower 715 might actually be one or more antennas capable of cellular communication located on an actual cell tower or other structure (e.g., a building). Cell Tower 715 communicates with Originating Service Provider F 701 using interface IF75. The coverage area of Cell Tower 715 includes portions of the service areas of both PSAP V 705 and PSAP U 708 (and includes Mail 718 located in the service area of PSAP V 705).

716 PSAP V/PSAP U Service Boundary. Boundary line 716 divides the service area of PSAP V 705 from that of PSAP U 708. In normal operation, 9-1-1 calls are routed to the appropriate PSAP based on the service area in which the initiating device is or is estimated to be located or based on a location for routing associated with a cell being used by the device. This is known as location-based routing. In the case of a wired device, the actual location of the device may be known and may be represented in civic form (i.e., a validated street address such as might exist within a Master Street Address Glossary (MSAG) or equivalent). For wireless devices, the appropriate PSAP may be determined based on the cell site/sector through which the device is initiating the call, often referred to as "course location" or "location for routing." As location determination technologies improve in accuracy, precision, and latency, a more accurate estimate of the device's location may be used.

717 Wired Device. Wired Device 717 is located within Mall 718 and is connected to Originating Service Provider G 702 via interface IF76. The network access information (e.g., if Wired Device 717 is connected using an Ethernet cable to a router eventually connected to IF76 (which might, for example, be an OC-12 fiber-optic line), information about connection (e.g., the OC-12 line)) may be used by Originating Service Provider G 702 to route a 9-1-1 call to an ESInet 711 using the Interface IF72 in FIG. 7 and may be provided or made available to the PSAP.

718 Mall. Mall 718 is a large venue located within the service area of PSAP V 705 and within the coverage area of Cell Tower 715.

719 ESRP. ESRP 719 is the entry point for 9-1-1 calls into ESInet 711. ESRP 719 may use any location information initially available with the call (e.g., the address of Cell Tower 715 or a pre-configured or associated location for routing associated with Cell Tower 715, or address information for interface IF76), in conjunction with any applicable Policy-Based Routing rules, to determine the route for a 9-1-1 call (e.g., a URN towards PSAP V 705 or PSAP U 708).

720 E-CSCF. E-CSCF 720 is used by Originating Service Provider F 701 to process emergency calls. E-CSCF 720 may use network access information for the device initiating an emergency call (e.g., an address associated with Cell Tower 715 or a pre-configured or associated location for routing associated with Cell Tower 715), possibly in consultation with LRF 722 and/or RDF 723 to route a 9-1-1 call towards a PSAP (e.g., a URN for ESRP 719 in ESInet 711 via Interface IF77).

721 E-CSCF. E-CSCF 721 is used by Originating Service Provider G 702 to process emergency calls. E-CSCF 721 may use network access information (e.g., location information associated with an endpoint for interface IF76) for the device initiating an emergency call, possibly in consultation with LRF 724 and/or RDF 725 to route a 9-1-1 call towards a PSAP (e.g., a URN for ESRP 719 in ESInet 711 via Interface IF78).

722 LRF. LRF 722 performs location retrieval and determination functions for Originating Service Provider F 701 and may determine (possibly in consultation with RDF 723) a route towards a PSAP (e.g., a URN for ESRP 719 in ESInet 711). LRF 722 may also provide location information to downstream entities (e.g., to ESRP 719 and/or a PSAP), e.g., by providing E-CSCF 720 a location value or a location reference to include in an emergency or test emergency call; such a location reference may be used by ESRP 719 to obtain a location for routing and/or by a PSAP to obtain location or a location estimate for dispatch; the location reference may be for an interface provided by LRF 722.

723 RDF. RDF 723 performs route determination functions for Originating Service Provider F 701 and may determine a route towards a PSAP (e.g., a URN for ESRP 719 in ESInet 711).

724 LRF. LRF 724 performs location determination functions for Originating Service Provider G 702 and may determine (possibly in consultation with RDF 723) a route towards a PSAP (e.g., a URN for ESRP 719 in ESInet 711). LRF 722 may also provide location information to downstream entities (e.g., to ESRP 719 and/or a PSAP), e.g., if a location reference is included in a SIP Geolocation header field in a SIP INVITE routed from E-CSCF 720 to ESRP 719, the location reference may be for an interface provided by LRF 722.

725 RDF. RDF 723 performs route determination functions for Originating Service Provider G 702 and may determine a route towards a PSAP (e.g., a URN for ESRP 719 in ESInet 711).

726 P-CSCF. P-CSCF 726 serves as a SIP proxy for devices initiating calls using Originating Service Provider F 701. In the example of FIG. 7, it routes emergency and test emergency calls to E-CSCF 720.

727 P-CSCF. P-CSCF 727 serves as a SIP proxy for devices initiating calls using Originating Service Provider G 702. In the example of FIG. 7, it routes emergency and test emergency calls to E-CSCF 721.

The Interfaces, which may or may not be VPN (Virtual Private Network) interfaces depicted in FIG. 7 and the roles they play in the scenarios below are:

IF70 An interface between an ESInet 711 or a Test Call Manager 712 and a Test Call Responder 706.

IF71 An interface between an ESInet 711 or a Test Call Manager 712 and a Test Call Responder 709.

IF72 An interface between the ESInet 711 or a Test Call Manager 712 and a Test Call Generator 703.

IF73 An interface between the ESInet 711 or a Test Call Manager 712 and a Test Call Generator 704.

IF74 An interface between Cell Tower 715 and Originating Service Provider F 701.

IF75 An interface between Cell Tower 715 and Mobile Devices 713 and 714. This interface might be, for example, LTE, CDMA, GSM, or any other air interface.

IF76 An interface between Mall 718 and Originating Service Provider G 702.

IF77 An interface from Originating Service Provider F 701 to ESInet 711. In the example shown in FIG. 7, this interface is from E-CSCF 720 used by Originating Service Provider F 701 to ESRP 719 in ESInet 711.

IF78 An interface from Originating Service Provider G 702 to ESInet 711. In the example shown in FIG. 7, this interface is from E-CSCF 721 used by Originating Service Provider G 702 to ESRP 719 in ESInet 711.

IF79 An interface from Test Call Generator 703 to P-CSCF 726, by which Test Call Generator 703 initiates test calls.

IF80 An interface from Test Call Generator 704 to P-CSCF 727, by which Test Call Generator 704 initiates test calls.

2d. Operation/Function/Use

In legacy and most currently deployed 9-1-1 systems, including "Enhanced 9-1-1" (E9-1-1), the elements of the 9-1-1 system are tested manually by dialing "911" from a telephone or mobile device. If everything in the system is working correctly, a call is delivered to the correct Public Safety Answering Point ("PSAP") and a call-taker will answer it. The E9-1-1 system usually delivers information about the caller's location and subscriber information to the PSAP. Authorized support personnel including the person making a test call can verbally inquire about the information delivered with the call or otherwise determine if elements of the system are working correctly. Such test calls are usually kept to a minimum because they can interrupt call takers who are expected to respond to real emergency calls. Such 9-1-1 "test calls" from consumers are often strongly discouraged.

In Next Generation 9-1-1 (NG9-1-1), voice, video, and/or text emergency calls are initiated by callers using telephones or other communications devices connected to an Originating Service Provider. The Originating Service Providers, in turn, deliver these calls to elements in the NG9-1-1 system that is made up of Core Services and Public Safety Answering Points interconnected through one or more ESInets (Emergency Services IP Networks).

The NG9-1-1 Core Services elements operating within an ESInet determine (typically from the caller's location information and/or other information associated with the call and call routing policy) to which PSAP the call should be routed (typically based on which PSAP is responsible for calls coming from that location) and routes the call through the ESInet to the correct PSAP. If an emergency 9-1-1 call is terminated prematurely, the PSAP may use information received with the call to initiate a call back to the calling device in an attempt to reconnect with the calling party.

In NG9-1-1, a test call mechanism was developed and described in the Internet Engineering Task Force (IETF) RFC 6881 Best Current Practice for Communications Services in Support of Emergency Calling. This method allows a device in an Originating Service Provider's network to initiate a test call that requires successful processing by the operational elements of the NG9-1-1 system and ESInet facilities in order for the call to reach the correct PSAP. Policy Routing Rules determine the conditions that control how and when calls are routed to specific PSAPs. These rules may route calls to different PSAPs depending on time-of-day, PSAP status, type of call (e.g., vehicle-initiated), media requested (e.g., video for sign language), language requested (e.g., English, Spanish, French) and/or other factors. The implementation of Policy Routing Rules on call routing can also be tested. If the call reaches any PSAP (the correct PSAP or not), the RFC 6881 method allows equipment at the PSAP to respond and include information identifying the PSAP. If the call does not reach a PSAP or reaches an incorrect PSAP, the sending device does not receive the expected response and can report a test failure. RFC 6881 does not provide a mechanism by which the sending device can determine the correct PSAP. RFC 6881 does not provide a mechanism by which the sending device can report a test failure. The RFC 6881 test call method only requires equipment at a PSAP to respond to the test call and it does not require a call taker to answer the call.

Limitations in the application of the test call mechanism described in RFC 6881.

If test calls using the method described in RFC 6881 do not reach the correct PSAP, that PSAP will not independently know that a test call was attempted and that it failed, unless some undefined external notification about a test is made. Likewise, when a test call using the method of RFC 6881 does reach the intended PSAP, that PSAP is not provided confirmation of the success (absent any undefined external notification). Similarly, should a test call using the RFC 6881 method reach an incorrect PSAP, no mechanism is provided or defined for that PSAP to know that the test call was received in error. Similarly, RFC 6881 does not provide a mechanism by which the originating device can determine the correct PSAP or report a test call failure.

RFC 6881 recommends that a test performed by an originating device "be repeated approximately every 30 days with a random interval". Such infrequent testing cannot be used to detect operation-affecting failures as quickly as necessary to respond and restore critical emergency call processing. The test procedures in RFC 6881 apply to originating devices and do not provide a means of reporting results.

The scope of RFC 6881 is limited. It does not address the systematic test or verification of the NG9-1-1 system. It does not address: geographic coverage (adequately testing emergency call origination within a certain geographic coverage zone, such as that of a PSAP, ESInet, origination network, etc.); boundary coverage (adequately testing emergency call origination close to a border zone); type of origination (e.g., wireless, wireline, nomadic, over-the-top, etc.); testing of call-backs; verification of which NG9-1-1 element handled the call; reporting of errors and exceptions; discovery (how PSAPs or ESInets discover which originating networks may deliver calls to them and what facilities are available within those networks to facilitate or enable Test Call origination; how originating networks discover ESI nets and PSAPs to which they may deliver emergency calls and any registration facilities provided by those elements for the use of the originating networks); testing advanced functionality, such as vehicle incident data transmitted in an Automatic Crash Notification (CAN) call; etc. The present disclosure overcomes these limitations.

The NG9-1-1 Test Call System automates the sending and receiving of RFC 6881-compliant test calls in ways that can reveal and report anomalies not otherwise possible:

1. Anomalies can be detected within minutes (or even seconds) of occurrence.
2. Anomalies can be detected both at a PSAP (e.g., a PSAP that did not receive a test call it should have or a PSAP that received a test call that it should not have) and at a test call originating device.
3. System capacities can be tested by stress testing the call processing systems with high call volume.
4. The ability of a PSAP to complete a call back to an originating calling device can be tested.
5. Enhanced capability calls, such as Automatic Crash Notification (ACN), can be simulated and the enhanced functionality (such as the delivery of vehicle crash information, requests from a PSAP for the vehicle to take actions) can be tested, etc.
6. The location determination technology and call routing of mobile and portable devices can be tested, including of actual mobile devices as well as the determined or simulated location or access points (e.g., PLMN cell towers or wired endpoints).
7. Policy-based routing rules, including those involving location or network access point (such as a serving PLMN cell), as well as other factors, can be tested.
8. Consumers can generate test calls without interrupting call takers or threatening system capacity.

9. The Test Call System has multiple fail-safe design elements to mitigate against failures or misconfigurations of the system itself. For instance, test calls contain information tracing them to the Test Call Generator and Test Call Profile that caused them to be generated, and information on an interface provided by the Test Call Generator allowing a Test Call Responder to request that the test calls stop; Test Call Generators may reduce the frequency at which they generate test calls per a Test Call Profile, or pause or suspend a Test Call Profile, if all or a portion of test calls result in errors or unexpected results; minimum and maximum intervals for Test Call Reports can be specified.

Figure 8:
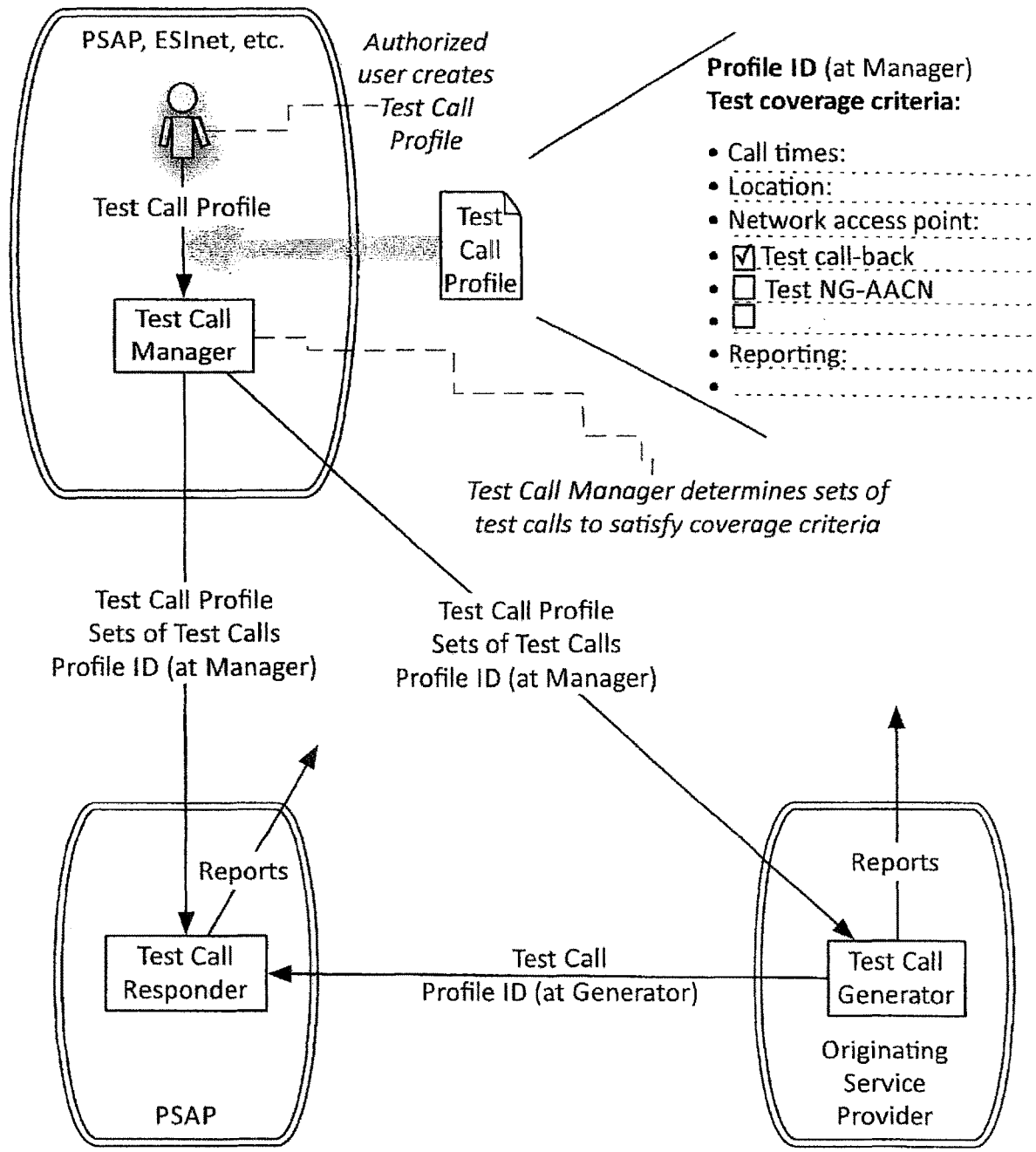
FIG. 8 illustrates information flow among a Test Call Manager, a Test Call Generator and a Test Call Responder.

FIG. 8 is useful showing the interaction of the Test Call Manager, Test Call Generator and Test Call Responder with the Test Call Profile.

Test Scenario 1: Periodic test calls to a Test Call Responder in a PSAP.

In this scenario, test calls are automatically generated on a periodic basis with a frequency selected to provide responsive notice to service providers, PSAPs and other entities that calls from the service provider are not being received at the correct PSAP. The period between test calls is selectable and may be in the range of a few minutes, hours or longer, depending on how soon after a failure the service provider, PSAP, or other entities need to be notified of a failure. Multiple, simultaneous tests using this scenario can simulate 9-1-1 calls originating from various locations within a geographic area.

Here are the steps in the process to create ongoing periodic test calls originating from Service Provider A 101:

1. A user on a Test Call Manager 116 configures the parameters for periodic test calls between an Originating Service Provider A 101 and PSAP X 109. The test call parameters for the Test Call Generator 105 and Test Call Responder 110 are saved in a database in the Test Call Manager 116.
2. The Test Call Manager 116 makes a secure connection to the Test Call Responder 110 at the PSAP X 109 using interfaces IF11 and IF2 and configures a Test Call Profile for that test on the Test Call Responder 110.
3. The Test Call Manager 116 makes a secure connection to the Test Call Generator 105 using interfaces IF11 and IF3 and configures a Test Call Profile for that test on the Test Call Generator 105.
4. The Test Call Profiles in the Test Call Generator 105 and in the Test Call Responder 110 determine whether the test calls start immediately or at a scheduled start time.
5. The Test Call Profiles in the Test Call Generator 105 and in the Test Call Responder 110 determine whether the test calls continue indefinitely or stop at a designated time.
6. The Test Call Profiles in the Test Call Generator 105 and in the Test Call Responder 110 determine whether the test calls are started and stopped according to a schedule of designated days and times.
7. Test calls may include a caller location provided by value or by reference.
8. The Test Call Generator 105 begins sending test calls based on the Test Call Profile.
9. The Test Call Responder 110 receives test calls and acknowledges them.
10. If the Test Call Responder 110 does not receive expected test calls as scheduled and at the configured interval, it notifies the entities identified in the Test Call Profile.
11. If the Test Call Generator 105 does not receive acknowledgments from the expected Test Call Responder 110, it notifies the entities identified in its Test Call Profile.
12. At the completion of the test or periodically as determined in the Test Call Profile, the Test Call Responder 110 delivers the test call results to the Test Call Manager 116.
13. At the completion of the test or periodically as determined in the Test Call Profile, the Test Call Generator 105 delivers the test call results to the Test Call Manager 116.

Test Scenario 2: Periodic Test Calls to a Call Handling Functional Element in a PSAP.

Here are the steps in the process to create periodic test calls and responses between the Test Call Generator 105 and the Call Handling Functional Element 114 in another implementation where the Test Call Responder 115 monitors the test calls and responses by using an Ethernet switch Tap or SPAN Port 113. For a PSAP configured in this embodiment as PSAP Y 112, the Test Call Responder 115 is connected to the Internet, but not directly connected to the ESInet. In this scenario, the Call Handling Functional Element 114 implements some of the functions of a Test Call Responder, including receiving and acknowledging test calls. This scenario is useful when a Call Handling Functional Element such as the one depicted as 114 is configured to respond to RFC 6881 test calls and there is a desire to include that element in test calls. This scenario may occur simultaneously with all other test scenarios described here.

1. A user on a Test Call Manager 116 configures the parameters for periodic test calls between an Originating Service Provider A 101 and PSAP Y 112. The test call parameters for the Test Call Generator 105 and Test Call Responder 115 are saved in a database in the Test Call Manager 116.
2. The Test Call Manager 116 makes a secure connection to the Test Call Responder 115 at the PSAP Y 112 using interface IF10 and IF12 and configures a Test Call Profile for that test on the Test Call Responder 115.
3. The Test Call Manager 116 makes a secure connection to the Test Call Generator 105 using interfaces IF10 and IF4 and configures a Test Call Profile for that test on the Test Call Generator 105.
4. The Test Call Profiles in the Test Call Generator 105 and in the Test Call Responder 115 determine whether the test calls start immediately or at a scheduled start time.
5. The Test Call Profiles in the Test Call Generator 105 and in the Test Call Responder 115 determine whether the test calls continue indefinitely or stop at a designated time.
6. The Test Call Profiles in the Test Call Generator 105 and in the Test Call Responder 115 determine whether the test calls are started and stopped according to a schedule of designated days and times.
7. Test calls may include a caller location provided by value or by reference.
8. The Test Call Generator 105 begins sending test calls based on the Test Call Profile.
9. The Call Handling Functional Element 114 receives test calls and acknowledges them.
10. The Test Call Responder 115 monitors the data flowing to and from the Call Handling Functional Element 114 using an Ethernet switch Tap or SPAN Port 113.

11. If the Test Call Responder 115 does not detect the receipt of expected test calls as scheduled and at the configured interval, it notifies the entities identified in the Test Call Profile.
12. If the Test Call Responder 115 does not detect the transmission of the expected acknowledgment response to a test call from the Call Handling Functional Element 114 following the receipt of a test call, it notifies the entities identified in the Test Call Profile.
13. If the Test Call Generator 105 does not receive acknowledgments from the expected Test Call Responder 115, it notifies the entities identified in its Test Call Profile.
14. At the completion of the test or periodically as determined in the Test Call Profile, the Test Call Receiver 115 delivers the test call results to the Test Call Manager 116.
15. At the completion of the test or periodically as determined in the Test Call Profile, the Test Call Generator 105 delivers the test call results to the Test Call Manager 116.

Test Scenario 3: Test Calls Initiated by a Mobile Test Call Manager Application.

In this scenario, a Mobile Test Call Manager 100 can be positioned in a location where its caller location is determined by the various location technologies available for that device. Test calls generated in this scenario simulate 9-1-1 calls generated by a wireless device calling from various locations.

Here are the steps in the process to create ongoing periodic test calls:
1. A Mobile Test Call Manager 100 is placed where it is desired to test the location determination capability of the Originating Service Provider as well as the routing and delivery of 9 1 1 calls from that location.
2. A user on the Mobile Test Call Manager 100 configures the parameters for periodic test calls between an Originating Service Provider A 101 and PSAP X 109.
3. A user on the Mobile Test Call Manager 100 configures the actual location of the Mobile Test Call Manager as an information field in the Test Call Profiles.
4. The test call parameters for the Test Call Generator 105 and Test Call Responder 110 are saved in a database in the Test Call Manager 116. The caller location for use in the Test Call Profiles is created by the Originating Service Provider's location determining technology.
5. The Mobile Test Call Manager 100 makes a secure connection to the Test Call Responder 110 at the PSAP X 109 using interfaces IF3 via an ESInet and IF2 and configures a Test Call Profile for that test on the Test Call Responder 110.
6. The Mobile Test Call Manager 100 makes a secure connection to the Test Call Generator 105 and configures a Test Call Profile for that test on the Test Call Generator 105.
7. The Test Call Profiles in the Test Call Generator 105 and in the Test Call Responder 110 determine whether the test calls start immediately or at a scheduled start time.
8. The Test Call Profiles in the Test Call Generator 105 and in the Test Call Responder 110 determine whether the test calls continue indefinitely or stop at a designated time.
9. The Test Call Profiles in the Test Call Generator 105 and in the Test Call Responder 110 determine whether the test calls are started and stopped according to a schedule of designated days and times.
10. Test calls may include a caller location provided by value or by reference.
11. The Test Call Generator 105 begins sending test calls based on the Test Call Profile.
12. The Test Call Responder 110 receives test calls and acknowledges them.
13. If the Test Call Responder 110 does not receive expected test calls as scheduled and at the configured interval, it notifies the entities identified in the Test Call Profile.
14. If the caller location that the received with the call is not the same as the actual location entered in Step 3, the test Call Receiver 110 notifies the entities identified in its Test Call Profile.
15. If the Test Call Generator 105 does not receive acknowledgments from the expected Test Call Responder 110, it notifies the entities identified in its Test Call Profile.
16. At the completion of the test or periodically as determined in the Test Call Profile, the Test Call Responder 110 delivers the test call results to the Mobile Test Call Manager 100.
17. At the completion of the test or periodically as determined in the Test Call Profile, the Test Call Generator 105 delivers the test call results to the Mobile Test Call Manager 100.

Test Scenario 4: Test Calls Initiated in a Test Call Generator Triggered by Receiving a Call from an Identified Mobile Device that Dials a Special Number.

An Identified Mobile Device 117 has its identity registered with the Originating Service Provider A 101 as a device authorized to interface with a Test Call Generator 105 for the purpose of generating a test call with the Determined Caller Location. This scenario does not require a special application to run on the Identified Mobile Device and can include testing of the location determination technology for a variety of device models. This scenario is intended to allow a wide variety of calling devices to be tested. The results of these tests are delivered to the entities identified in the Test Call Profile, including the calling device which may be notified of the results by calling with a pre-recorded message.

Here are the steps in the process to create test calls from a mobile device that dials a special number:
1. A user on a Test Call Manager 116 configures the parameters for test calls between an Originating Service Provider A 101 and a PSAP X 109 to be initiated by an Identified Mobile Device 117. The test call parameters for the Test Call Generator 105 and Test Call Responder 110 are saved in a database in the Test Call Manager 116.
2. The Test Call Manager 116 makes a secure connection to the Test Call Responder 110 at the PSAP X 109 using interfaces IF11 and IF2 and configures a Test Call Profile for that Identified Mobile Device 117 on the Test Call Responder 110.
3. The Expected Caller Location data in the Test Call Responder 110 profile is provided by Test Call Manager 116, if known.
4. The Test Call Manager 116 makes a secure connection to the Test Call Generator 105 using interfaces IF11 and IF3 and configures a Test Call Profile for that Identified Mobile Device on the Test Call Generator 105.
5. A user with the Identified Mobile Device 117 dials a special number designated by the Originating Service Provider.

6. The Originating Service Provider A 101 verifies the identity of the Identified Mobile Device 117 and provides the Test Call Generator 105 with the calling number and determined caller location of the Identified Mobile Device 117.
7. The Determined Caller Location used in the Test Call Responder 110 is provided by the Originating Service Provider's location determining technology.
8. The Test Call Generator 105 either begins sending one or more test calls based on the Test Call Profile using interfaces IF3 and IF2, which may start the test calls immediately or at a scheduled start time.
9. The Test Call Responder 110 receives test calls, acknowledges them and logs the caller location reported with the call.
10. The Test Call Responder 110 displays the caller location reported with the call as well as the Expected Caller Location, if received.
11. If the Test Call Responder 110 does not receive expected test calls, it notifies the entities identified in the Test Call Profile. One of the entities identified in the Test Call Profile may be the calling device which may be notified of the results of the test call by calling with a pre-recorded message.
12. If the Test Call Generator 105 does not receive acknowledgments from the expected PSAP X 109 Test Call Responder 110, it notifies the entities identified in its Test Call Profile. One of the entities identified in the Test Call Profile may be the calling device which may be notified of the results of the test call by calling with a pre recorded message.
13. At the completion of the test or periodically as determined in the Test Call Profile, the Test Call Responder 110 delivers the test call results to the Test Call Manager 116 using interfaces IF2 and IF11.
14. At the completion of the test or periodically as determined in the Test Call Profile, the Test Call Generator 105 delivers the test call results to the Test Call Manager 116 using interfaces IF3 and IF11.

Test Scenario 5: Test Calls Initiated in a Test Call Generator Triggered by Receiving a Call from a Consumer's Device when the Consumer Dials a Special Number.

A consumer with a wireless Mobile Device 118, Standard Wired Device 119 or Portable Wired Device 120 generates a 9-1-1 test call. This scenario does not require a special application to run on the Identified Mobile Device. This scenario allows consumers to make 9-1-1 test calls without interrupting call takers or otherwise presenting a burden to NG9-1-1 resources. The permitted frequency of these calls and availability of the feature may be limited by policy.

Here are the steps in the process to create test calls from a mobile device that dials a special number:
1. An Originating Service Provider B 104 creates and publishes a dialable telephone number ("Emergency Test Call Number") to be used by consumers to test 9 1 1 calls.
2. A consumer using a wireless Mobile Device 118, Standard Wired Device 119 using interface IF1, or Portable Wired Device 120 using interface IF8 dials the Emergency Test Call Number.
3. The Test Call Generator 106 determines if the calling device has previously made test calls and if so, whether the incoming test call should or should not be processed according to policy. If the call is not allowed by policy, a voice message may be returned to the caller to that effect. If the call is allowed, the process continues to the next step.
4. Test Call Generator 106 initiates a call to the Test Call Responder 110 at PSAP X 109 using interfaces IF5 and IF2.
5. In one embodiment, the Test Call Generator 106 forwards (bridges) the caller's device to the Test Call Responder 110 at PSAP X 109.
6. In another embodiment (4b), the Test Call Generator 106 initiates a test call to Test Call Responder 110 at PSAP X 109 without bridging the caller's device.
7. The Test Call Responder 110 at PSAP X 109 answers the call.
8. In one embodiment, the Test Call Responder 110 at PSAP X 109 answers the call and plays an audio message including the identification of the answering PSAP. For text calls, a text message identifying the answering PSAP is sent to the consumer's device.
9. In another embodiment, the Test Call Responder 110 receives the test call, acknowledges it and logs the caller location reported with the call. The Test Call Generator 106 sends an audio (or text) message to the caller's device indicating the results of the test call, including the identification of the PSAP that received the call.
10. If the Test Call Generator 106 does not receive acknowledgments from the expected PSAP X 109 Test Call Responder 110, it notifies the entities identified in its Test Call Profile and sends an audio or text message to the consumer's calling device indicating a failure.

Test Scenario 6: Test Call that Simulates an Abandoned Call that Initiates a Call Back from the PSAP.

When a 9-1-1 is terminated by a caller, it may be considered an "abandoned call." If a call-back number is provided with a test call, the PSAP may be configured to attempt to call the originating device back. If a test call includes a call-back number, and the Test Call Generator profile includes a request for a call-back, and/or the test call includes a data block requesting a call-back, the Test Call Responder 110 or Call Handling functional element 111 may initiate a call back to a device associated with the call back number or to the Test Call Generator to test the ability of the NG9-1-1 infrastructure to process call-back calls. The Test Call Responder 110 or Call Handling functional element 111 may verify that the test call includes a data block that requests a call-back and is digitally signed by an authorized entity.

Here are the steps in the process to create test calls from a mobile device that dials a special number:
1. A user on a Test Call Manager 116 configures the parameters for a test call between an Originating Service Provider A 101 and PSAP X 109. The test call parameters for the Test Call Generator 105 and Test Call Responder 110 are saved in a database in the Test Call Manager 116. The Test Call Profile includes a call back number associated with a specific device such as the Portable Wireless Device 103 and an indicator that a call back is requested.
2. The Test Call Manager 116 makes a secure connection to the Test Call Responder 110 at the PSAP X 109 using interfaces IF11 and IF2 and configures a Test Call Profile for that test on the Test Call Responder 110.
3. The Test Call Manager 116 makes a secure connection to the Test Call Generator 105 using interfaces IF11 and IF3 and configures a Test Call Profile for that test on the Test Call Generator 105.
4. The Test Call Profiles in the Test Call Generator 105 and in the Test Call Responder 110 determine whether the test call starts immediately or at a scheduled time.

5. The Test Call Generator 105 sends the test call using interfaces IF3 and IF2 based on the Test Call Profile.
6. The Test Call Responder 110 receives a test call and acknowledges it.
7. The Test Call Generator disconnects the call, simulating a caller hanging up or an otherwise disconnected call.
8. The Test Call Responder 110 initiates a call back to the number associated with the calling device.
9. A person with the Portable Wireless Device 103 answers the call back.
10. The Test Call Responder 110 plays an audio message including the identification of the answering PSAP. For text calls, a text message identifying the answering PSAP is sent to the consumer's device.
11. If the Test Call Responder 110 does not receive the expected test call, it notifies the entities identified in the Test Call Profile.
12. If the Test Call Generator 105 does not receive acknowledgments from the expected Test Call Responder 110, it notifies the entities identified in its Test Call Profile.
13. A person with the Portable Wireless Device 103 reports whether or not the call back was received by the Portable Wireless Device 103 to the person managing the Test Call Manager 116, who enters the results into the Test Manager 116.
14. At the completion of the test, the Test Call Responder 110 delivers the test call results to the Test Call Manager 116.
15. At the completion of the test, the Test Call Generator 105 delivers the test call results to the Test Call Manager 116.

Test Scenario 7: Test Call Explicitly Requesting a Call Back from the PSAP.

As illustrated in FIG. 5, a test call might include information 506 requesting that the receiving PSAP perform a call-back test. The Test Call Responder 110, 210, 310 or Call Handling functional element 111 may then, after terminating the test call (e.g., sending a SIP BYE request after successful establishment of the test call) or rejecting the test call initiation request (e.g., sending a SIP 486 BUSY HERE response code to the initial SIP INVITE request), initiate a call back using the information in the call-back request 506, to test the ability of the NG9-1-1 infrastructure to initiate and complete call-back calls. The Test Call Responder 110, 210, 310 or Call Handling functional element 111 may verify that the test call includes a Test Info block 504 that requests a call-back and is either digitally signed by an authorized entity or was received from or routed via a trusted entity (e.g., Test Call Generator 105 or 217 or 316, or VPN access point 205, or SIP B2B UA 206 or 306).

Here are the steps in the process to create such tests:
1. A user on a Test Call Manager 116 or 216 or 317 configures the parameters for one or more test calls between an Originating Service Provider A 101 and PSAP X 109 or Originating Service Provider C 201 and PSAP Z 209, or Originating Service Provider E 301 and PSAP W 309. The test call parameters for the Test Call Generator 105 or 217 or 316 and Test Call Responder 110 or 210 or 310 are saved in a database or other storage in the Test Call Manager 116 or 216 or 317. The Test Call Profile includes a call-back URI associated with an entity such as Test Call Generator 105, 217, 316 or Test Call Manager 116, 216, 317, and an indicator that a call back is requested.
2. The Test Call Manager 116 or 216 or 317 makes a secure connection to the Test Call Responder 110 or 210 or 310 at the PSAP X 109 or PSAP Z 209 or PSAP W 309 using interfaces IF11 and IF2 or IF21 and IF20 or IF32 and configures a Test Call Profile for that test on the Test Call Responder 110 or 210 or 310. Alternately, the Test Call Profile is not configured on the Test Call Responder 110 or 210 or 310, relying on the automatic processing and handling of test calls at the Test Call Responder 110 or 210 or 310, along with the identifying information contained in the Test Info 504.
3. The Test Call Manager 116 or 216 or 317 makes a secure connection to the Test Call Generator 105 or 217 or 316 and using interfaces IF11 and IF3 or IF21 or IF33 and configures a Test Call Profile for that test call or set of test calls on the Test Call Generator 105 or 217 or 316.
4. The Test Call Profile(s) in the Test Call Generator 105 or 217 or 316 determine when the test call(s) start and at what intervals, if any, they continue.
5. The Test Call Generator 105 or 217 or 316 initiates the test call(s) using interfaces IF3 and IF2 or IF22 or IF23 or IF34 based on the Test Call Profile. The test call(s) include a Test Info block 504 containing a call back request 506. The call back request 506 includes a URI (e.g., a "tel" or SIP URI) associated with the Test Call Generator 105, 217, 316 or Test Call Manager 116, 216, 317.
6. The Test Call Responder 110 or 210 or 310 receives the test call(s) and acknowledges it by including a test information object 603 in the SIP final response to the call initiation (e.g., the SIP 200 OK response to the initial SIP INVITE request).
7. Media packets sent by the Test Call Generator 105 or 217 or 316 are echoed back by the Test Call Responder 110 or 210 or 310 in accordance with RFC 6881.
8. The Test Call Generator 105 or 217 or 316 or the Test Call Responder 110 or 210 or 310 disconnects the call(s).
9. Alternatively, at step (6), the Test Call Responder 110 or 210 or 310 rejects the test call initiation (e.g., by sending a SIP 486 Busy Here response code). As at step (6), the Test Call Responder 110 or 210 or 310 acknowledges the test call by including a test information object 603 in the SIP final response (e.g., in a SIP 486 Busy Here response), and therefore, no call is established, and no media packets are exchanged.
10. The Test Call Responder 110 or 210 or 310 initiates a call back using the information in the call back request 506, e.g., to the Test Call Generator 105, 217, 316 or Test Call Manager 116, 216, 317.
11. Alternatively, step (10) is performed before sending the final response in step (6), so the final response includes a test information object 603 reporting the result of the call-back test.
12. If the Test Call Responder 110 or 210 or 310 is configured with a Test Call Profile and thus is expecting to receive the test call(s) but does not receive the expected test call(s), it notifies the entities identified in the Test Call Profile.
13. If the Test Call Generator 105, 217, or 316 does not receive acknowledgments from the expected Test Call Responder 110 or 210 or 310, or if the test information object 603 is from an unexpected entity, or if the test information object 603 reports that the test call back encountered an error, it notifies the entities identified in its Test Call Profile.

14. If the Test Call Responder 110 or 210 or 310 is configured with a Test Call Profile and the call-back test fails, it notifies the entities identified in its Test Call Profile.
15. If the entity configured in the Test Call Profile to receive the test call back (e.g., Test Call Generator 105, 217, 316 or Test Call Manager 116, 216, 317) does not receive the test call back, it notifies the entities identified in the Test Call Profile.
16. If the Test Call Responder 110 or 210 or 310 is configured with a Test Call Profile, at the completion of the test, it delivers the test call results to the Test Call Manager 116, 216, or 317.
17. At the completion of the test, the Test Call Generator 105, 217, or 316 delivers the test call results to the Test Call Manager 116, 216, or 317.

Test Scenario 8: NG9-1-1 System Stress Testing.

In this scenario, one or more Test Call Generators at one or more service providers generate multiple test calls at high rates to test the NG9-1-1 infrastructure's ability to handle high 9-1-1 call volume or to survive Denial of Service attacks.

Here are the steps in the process to create ongoing periodic test calls for stress testing:

1. A user on a Test Call Manager 116 configures the parameters for multiple periodic test calls between one or more Originating Service Providers 101, 104 and a PSAP 109. The number and frequency of test calls and test call generators used for stress testing are calculated to present the desired volume and rate of calls. The volume and rate may be configured to vary by time of day, day of week, time of year, etc. As an example, the volume and rate during peak winter workday morning drive time might be different than the volume and rate during summer weekend afternoons.
2. The Test Call Manager 116 makes a secure connection to the Test Call Responder 110 at the PSAP X 109 using interfaces IF11 and IF2 and configures a Test Call Profile for that test on the Test Call Responder 110.
3. The Test Call Manager 116 makes a secure connection to the Test Call Generator 105 using interfaces IF11 and IF3, and to the Test Call Generator 106 using interfaces IF11 and IF5 and configures multiple Test Call Profiles for those tests on the Test Call Generators 105, 106.
4. The Test Call Generators 105, 106 either begin sending test calls based on the Test Call Profiles, which may start the test calls at a scheduled start time and stop at a scheduled stop time. Test calls intended to stress test infrastructure would typically run for a short duration to prevent adversely affecting operational systems.
5. The Test Call Responder 110 receives test calls and acknowledges them.
6. If the Test Call Responder 110 does not receive expected test calls, it notifies the entities identified in the Test Call Profile.
7. The Test Call Responder 110 logs statistics for the receipt or failure of expected test calls.
8. If the Test Call Generator 105 does not receive acknowledgments from the expected Test Call Responder 110, it notifies the entities identified in its Test Call Profile.
9. The Test Call Generator logs statistics for the receipt or failure of acknowledgments from PSAPs for test calls.
10. At the completion of the test or periodically as determined in the Test Call Profile, the Test Call Responder 110 delivers the test call results to the Test Call Manager 116.
11. At the completion of the test or periodically as determined in the Test Call Profile, the Test Call Generators 105, 106 deliver the test call results to the Test Call Manager 116.

Test Scenario 9: Testing Calls Originating Near Service Area Boundary or with Day/Time Specific Routing.

PSAPs may wish to test and verify correct routing of calls originating near service area boundaries and/or which may be subject to time-of-day and/or other specific policy routing rules. Historically, emergency call routing has used precise location when calls originate from a wired device (i.e., where the street or civic address of the service location is known from a wire-map or other source) and a course or rough-approximate location when calls originate from a wireless device (e.g., all calls originating via a particular cell site/sector may be routed to the same PSAP). Wireless location determination technologies are continually advancing, e.g., small cells (smaller cells have smaller coverage areas, thus narrowing the possible positions of devices using the cell and hence increasing the accuracy of the course location), use of multiple global navigation satellite system (GNSS) constellations (increasing the accuracy and reducing the latency of GNSS position determination), use of multiple LTE positioning reference signals, observed time difference of arrival (OTDOA), the U.S. National Emergency Address Database (NEAD), Bluetooth location beacons, and so forth. As the latency of these techniques decreases, it becomes feasible that more precise location may be available for routing emergency calls to the appropriate PSAP.

As a separate but related issue, PSAPs may have time-of-day or other rules that affect routing. A simple example of this is a small PSAP that closes overnight, during which time calls are routed to a nearby cooperating PSAP. As another example, consider a situation where a shopping mall or other venue is within the service boundaries of one PSAP, while a public land mobile network (PLMN) carrier's cell tower is within the boundaries of and has a coverage area that overlaps a different PSAP's service area. It may be the case that a large percentage of calls originating via this particular cell tower (or a sector of it) are from devices located within the mall or another venue, at least during normal operating hours of the mall or during certain days and times when the venue is busy. In such a situation, there may be policy routing rules such that during certain days or times calls originating from that cell site/sector are routed to the PSAP serving the mall or venue, while at other times or days calls are routed to the PSAP whose boundaries contain the cell tower or perhaps the major portion of the coverage area of the cell site/sector.

It may therefore be desirable to test calls originating (or appearing to originate) near a PSAP's service boundary, or another location that may be subject to various policy based routing rules to verify correct routing when a precise location is used for routing, to verify that calls are correctly routed to one of several PSAPs. Even if there are no special policy routing rules, it may still be desirable to test calls originating (or appearing to originate) near the border, e.g., to verify that calls are routed correctly for the location. It may also be desirable to test calls originating (or appearing to originate) in certain locations on different days and/or at different times.

Here are the steps in the process to create such tests, referring to FIG. 7:

1. A user on a Test Call Manager 712 configures the parameters for one or more of a series of test calls simulating wireless callers originating calls with Originating Service Provider F 701, some of which are targeted at PSAP V 705 and others PSAP U 708, and one or more of a series of test calls simulating wired callers originating calls with Originating Service Provider G 702 with a target PSAP of PSAP V 705, and one or more of a series of tests simulating calls with precise location, each call having a location randomly generated to be inside the service area of PSAP V 705 (and hence a target PSAP of PSAP V 705) within a kilometer of the boundary 716 between PSAP V 705 and PSAP U 708, and one or more of a series of tests simulating calls with precise location, each call having a location randomly generated to be inside the service area of PSAP U 708 (and hence a target PSAP of PSAP U 708), within a kilometer of the boundary 716 between PSAP V 705 and PSAP U 708.
2. One or more of the Test Call Profiles indicate that test calls should be initiated using a location within Mall 718; the Test Call Profile may indicate that all calls for the profile use the same location, or that each call uses a location chosen at random within Mall 718. (These Test Call Profiles verify correct operation of emergency calls placed within Mall 718 and routed using precise location; these Test Call Profiles can be configured at Test Call Generator 703 to test calls initiated and routed via Originating Service Provider F 701, or at Test Call Generator 704 to test calls initiated and routed via Originating Service Provider G 702.)
3. One or more of the Test Call Profiles may indicate that calls should be initiated to simulate wireless emergency calls originating via Cell Tower 715 during normal opening hours of Mall 718, with an expected target PSAP of PSAP V 705. These Test Call Profiles are configured via interface IF72 at Test Call Generator 703 used by Originating Service Provider F 701 and configured via interface IF70 at Test Call Responder 706 used by PSAP V 705. These Test Call Profiles, when viewed at Test Call Manager 712, may show a configured access network information indicating that the calls should simulate access via Cell Tower 715 using an identifier for Cell Tower 715 known to both Test Call Generator 703 and Test Call Manager 712, and when viewed at Test Call Generator 703 may show a configured access network information with an internal identification for Cell Tower 715. (These Test Call Profiles verify correct operation of emergency calls placed within Mall 718 and routed by Originating Service Provider F 701 using course location such as access network information, e.g., that a wireless call was initiated via Cell Tower 715.)
4. One or more of the Test Call Profiles may indicate that calls should be initiated to simulate wireless emergency calls originating via Cell Tower 715 outside of normal opening hours of Mall 718, with an expected target PSAP of PSAP U 708. These Test Call Profiles are configured via interface IF72 at Test Call Generator 703 used by Originating Service Provider F 701 and configured via interface IF71 at Test Call Responder 709 used by PSAP U 708. These Test Call Profiles, when viewed at Test Call Manager 712, may show a configured access network information indicating that the calls should simulate access via Cell Tower 715 using an identifier for Cell Tower 715 known to both Test Call Generator 703 and Test Call Manager 712, and when viewed at Test Call Generator 703 may show a configured access network information with an internal identification for Cell Tower 715. (These Test Call Profiles verify correct operation of emergency calls placed within Mall 718 and routed by Originating Service Provider F 701 using course location such as access network information, e.g., that a wireless call was initiated via Cell Tower 715.)
5. One or more of the Test Call Profiles may indicate that calls should be initiated to simulate wired emergency calls originating via Interface IF76, with an expected target PSAP of PSAP V 705. These Test Call Profiles are configured via interface IF73 at Test Call Generator 704 used by Originating Service Provider G 702 and configured via interface IF70 at Test Call Responder 706 used by PSAP V 705. These Test Call Profiles, when viewed at Test Call Manager 712, may show a configured access network information indicating that the calls should simulate access via IF76 using an identifier for IF76 known to both Test Call Generator 704 and Test Call Manager 712, and when viewed at Test Call Generator 704 may show a configured access network information with an internal identification for IF76. (These Test Call Profiles verify correct operation of emergency calls placed within Mall 718 and routed by Originating Service Provider G 702 using precise location.)
6. The Test Call Manager 712 makes a secure connection to the Test Call Responder 706 at the PSAP V 705 using interface IF70 and configures those Test Call Profiles for which the expected target PSAP is PSAP V 705. The Test Call Manager 712 makes a secure connection to the Test Call Responder 709 at the PSAP U 708 using interface IF71 and configures those Test Call Profiles for which the expected target PSAP is PSAP U 708. Alternately, the Test Call Profiles are not configured on the Test Call Responders 706 or 709, relying on the automatic processing and handling of test calls at the Test Call Responders 706 and 709, along with the identifying information contained in the Test Info data block (such as shown in item 504 of FIG. 5).
7. The Test Call Generators 703 and 704 use the configured Test Call Profiles to determine when the test calls start and at what intervals, if any, they continue.
8. The Test Call Generator 703 initiates test calls using interface IF79 to P CSCF 726, to mimic how calls are initiated by non-test devices using Originating Service Provider F 701. The Test Calls are initiated carrying access network and/or location information, either as is done for non test calls (e.g., in commonly used SIP message fields, as, for instance, a SIP P Access Network Info header field for access network information, and/or a SIP Geolocation header field for location information, or, in a Test Info data block, as, for instance, shown in item 509 of FIG. 5 for access network information, and/or item 508 of FIG. 5 for location information. The test calls include a Test Info block (such as shown in item 504 of FIG. 5) containing information that identifies the Test Call Profile, the Test Call Generator, the expected target PSAP, etc.
9. P CSCF 726 routes the test call to E CSCF 720. P CSCF 726 and/or E CSCF 720 may use the method shown in FIG. 4 to verify that the calls are initiated by a trusted entity (e.g., verifying that the calls were originated by Test Call Generator 703 or that a Test Info data block is present and signed with acceptable credentials), and therefore use the access network and/or location information as supplied in the call. E.g., if access network information is supplied in a SIP P Access Network Info header field, P CSCF 726 and/or E CSCF 720 may use that; if access network information is supplied in a Test Info data block, P CSCF 726 and/or E CSCF 720 may use the info to populate a SIP P Access Network header field; if location information is supplied using a SIP Geolocation header field and/or a PIDF LO body part, P CSCF 726 and/or E CSCF 720 may use that; if location information is supplied in a Test Info data block, P CSCF 726 and/or E CSCF 720 may use the info to populate a SIP Geolocation header field and corresponding PIDF LO body part.

10. The Test Call Generator 704 initiates test calls using interface IF80 to P CSCF 727, to mimic how calls are initiated by non-test devices using Originating Service Provider G 702. The Test Calls are initiated carrying access network and/or location information, either as is done for non test calls (e.g., in commonly used SIP message fields, as, for instance, a SIP P Access Network Info header field for access network information, and/or a SIP Geolocation header field for location information, or, in a Test Info data block, as, for instance, shown in item 509 of FIG. 5 for access network information, and/or item 508 of FIG. 5 for location information. The test calls include a Test Info block (such as shown in item 504 of FIG. 5) containing information that identifies the Test Call Profile, the Test Call Generator, the expected target PSAP, etc.

11. P CSCF 727 routes the test calls to E CSCF 721. P CSCF 727 and/or E CSCF 721 may use the method shown in FIG. 4 to verify that the calls are initiated by a trusted entity (e.g., verifying that the calls were originated by Test Call Generator 704 or that a Test Info data block is present and signed with acceptable credentials), and therefore use the access network and/or location information as supplied in the calls. E.g., if access network information is supplied in a SIP P Access Network Info header field, P CSCF 727 and/or E CSCF 721 may use that; if access network information is supplied in a Test Info data block, P CSCF 727 and/or E CSCF 721 may use the info to populate a SIP P Access Network header field; if location information is supplied using a SIP Geolocation header field and/or a PIDF LO body part, P CSCF 727 and/or E CSCF 721 may use that; if location information is supplied in a Test Info data block, P CSCF 727 and/or E CSCF 721 may use the info to populate a SIP Geolocation header field and corresponding PIDF LO body part.

12. For each call it handles, E CSCF 720 consults LRF 722, which consults RDF 723, to determine that the target is an ESInet 711 and obtain a URN for ESRP 719. E CSCF 720 routes the call to the URN via interface IF77.

13. For each call it handles, E CSCF 721 consults LRF 724, which consults RDF 725, to determine that the target is an ESInet 711 and obtain a URN for ESRP 719. E CSCF 721 routes the call to the URN via interface IF78.

14. For each call, ESRP 719 uses the location information referenced in a SIP Geolocation header field (i.e., a URN referencing LRF 722 or LRF 724, or a CID URN referencing an application/pidf+xml body part) to determine the routing of the call within the ESInet. The location information may be that provided by Test Call Manager 712, or Test Call Generator 703 or Test Call Generator 704, or location information associated with access network information (which may have been provided by Test Call Manager 712, or Test Call Generator 703 or Test Call Generator 704). The ESRP 719 may take into account applicable Policy-Based Routing rules, which may include testing various aspects of the call (e.g., the Request URI, the presence of Additional Data items (e.g., a vehicle data set such as the Vehicle Emergency Data Set (VEDS)), SIP header fields, etc.).

15. For each call routed to PSAP V 705, Test Call Responder 706 receives the call and examines the Test Info data block (e.g., item 505 in FIG. 5).

16. For each call routed to PSAP U 708, Test Call Responder 709 receives the call and examines the Test Info data block (e.g., item 505 in FIG. 5).

17. If the Test Info data block includes a test call back request (e.g., item 506 in FIG. 5), Test Call Responder 706 or 709 may initiate the requested call back to the indicated call back URN and wait a reasonable amount of time to receive a final response, or may wait until after termination (or rejection) of the session or dialog to initiate the test call back.

18. Test Call Responder 706 or 709 prepares a response Test Info data block (e.g., item 603 in FIG. 6). This Test Info data block contains information about PSAP V 705 such as the type of entity (in this case, a PSAP) and its ID (in this example, "EXAMP9"), e.g., item 606 on FIG. 6. This Test Info data block also contains information (e.g., item 604 of FIG. 6) copied from the Test Info data block of the request (e.g., item 511 on FIG. 5). If a test call back was requested and Test Call Responder 706 or 709 attempted the call back immediately, a data element (e.g., item 607 of FIG. 6) is included indicating the result of the test call back (in the example of FIG. 6, a successful call back to telephone number+10005551212). The Test Info data block includes the location information obtained from the Geolocation header field of the INVITE request (if the Geolocation header field contained a CID referencing an application/pidf+xml body part, this Test Info data block contains the PIDF LO object from that body part; if the Geolocation header field contained a reference, this Test Info data block contains a dereferenced PIDF LO object).

19. Test Call Responder 706 or 709 prepares a text/plain body part per RFC 6881 that contains, on separate lines, the name of the PSAP, the request URN (e.g., "urn:service:sos.test"), and the location information obtained via the call's Geolocation header, as illustrated as item 608 of FIG. 6.

20. Test Call Responder 706 or 709 transmits a final response message to the call request (in the example of FIG. 6, a success response accepting the call) containing the response Test Info data block as well as the text/plain body part, as illustrated in the example of FIG. 6. (If PSAP V 705 or PSAP U 708 rejects the request for any reason, the failure response will contain the response Test Info data block as well as the text/plain body part.)

21. If Test Call Responder 706 or 709 accepted the session or dialog, it follows the RFC 6881 method of accepting media streams (e.g., loopback streams) and echoing back up to a small number (such as three) of each type of media packet received in the session or dialog.

22. If a test call back was requested, Test Call Generator 703 or Test Call Generator 704 may terminate the session or dialog (e.g., by transmitting a SIP BYE request). If Test Call Generator 703 or Test Call Generator 704 does not terminate the session or dialog, Test Call Responder 706 or 709 terminates the session or dialog (e.g., by transmitting a SIP BYE request).

23. If a test call back was requested and Test Call Responder 706 or 709 did not attempt the test call back earlier (e.g., at step 17), Test Call Responder 706 or 709 may initiate the requested call back to the indicated call back URN (indicated in, e.g., item 506 in FIG. 5).
24. If the Test Call Responder 706 or 709 is configured with one or more Test Call Profiles and fails to receive test calls as indicated in the Test Call Profile(s), it notifies the entities identified in the Test Call Profile(s).
25. For each test call, if the Test Call Generator 703 or 704 does not receive a Test Info data object (such as item 603 of FIG. 6) from the expected Test Call Responder 706 or 709, or if the Test Info data object is from an unexpected entity, or if the Test Info object reports that the test call back encountered an error, or if the test call was rejected by Test Call Responder 706 or 709 or encounters some other error, Test Call Generator 703 or 704 notifies the entities identified in the Test Call Profile. Test Call Generator 703 or 704 may combine multiple instances of failure into each notification. Test Call Generator 703 or 704 may reduce the frequency at which it generates test calls or make one or more Test Call Profiles inactive or suspended if all or a portion of test calls encounter errors.
26. If the Test Call Responder 706 or 709 is configured with one or more Test Call Profile(s) that specify test call back(s) and one or more of the test call back(s) fail, Test Call Responder 706 or 709 notifies the entities identified in the Test Call Profile.
27. If the entity configured in the Test Call Profile to receive the test call back (e.g., Test Call Generator 703 or 704, or Test Call Manager 712, or other entity) does not receive an expected call-back test, it notifies the entities identified in the Test Call Profile.
28. If the Test Call Responder 706 or 709 is configured with one or more Test Call Profiles, at the completion of each test or series of tests, or as otherwise indicated in a Test Call Profile, Test Call Responder 706 or 709 delivers the test call results to the Test Call Manager 712.
29. At the completion of each test or series of tests, or as otherwise indicated in a Test Call Profile, the Test Call Generator 703 or 704 delivers the test call results to the Test Call Manager 712.

Significant Advantages to this Invention

As described this invention introduces a new mechanism for automatically detecting problems within minutes of a failure of critical elements used in processing 9-1-1 calls in the new Next Generation 9-1-1 system (NG9-1-1). RFC 6881 recommends that "a full test SHOULD be repeated [by originating devices] approximately every 30 days "with a random interval." In an operational system used to deliver 9-1-1 calls, 30 days is too long to wait to become aware of a problem in an originating network, an ESInet, Core Services, or supporting elements that interfere with 9-1-1 call processing and delivery.

An advantage of this invention is that it provides a method for failures to be detected by or at a PSAP without relying on notification from other entities. The test call function in RFC 6881 was intended to detect anomalies only at the test call generator (i.e., an originating device) and with existing or proposed technology, there is no feature or function that is under the direct control of a PSAP or directly sensed at the PSAP.

Automatic testing of the call-back function is not currently available anywhere and not described in RFC 6881.

The system includes functions to stress test an NG9-1-1 system. The system provides management of NG9-1-1 test calls, which can include comprehensive configuration, scheduling, and reporting of calls within a narrow or broad geographic or operational region, such as a PSAP coverage area, a city, a county, a state, a country, or a region. The system provides the ability to test caller location determination technology and functions for mobile devices. The system provides the ability to comprehensively test location-based routing. The system provides the ability to test Policy-Based Routing Rules. The system provides the ability to test various combinations of location-based routing and Policy-Based Routing rules. The system provides a method for consumers to make limited non-intrusive 9-1-1 test calls. The system provides the ability for test calls to be automatically originated and verified based on various criteria. The system provides the ability to test advanced forms of 9-1-1 calls, such as Next-Generation Advanced Automatic Crash Notification (NG-AACN) calls, which are 9-1-1 calls initiated by vehicles automatically in the event of a crash or other incident or on request of a vehicle occupant, and which carry sensor and other information supplied by the vehicle, and which allow the PSAP to automatically process the data, and to request the vehicle to perform various actions.

What is claimed is:

1. A method of automated testing for an emergency calling system, comprising:
    establishing a set of test calls to satisfy test coverage criteria; where said establishing said set of test calls includes specifying a number, greater than one, of said test calls or a rate of test calls per unit time;
    initiating the set of test calls; and
    determining whether any of said test calls are not received.
2. The method of claim 1, wherein the test coverage criteria includes at least one of the following parameters:
    calls expected to be handled by a specific receiving PSAP;
    calls expected to be handled by a specific ESInet (which may include a plurality of PSAPs receiving calls via that ESInet);
    calls originating from or appearing to originate from a specific Originating Network (which may include a plurality of PSAPs and/or ESInets that may receive calls originating within the Originating Network);
    calls originating from or appearing to originate from a geographic location, region, or area;
    calls originating from or appearing to originate from a subtype of Origination Network (such as a wired or wireless service area) of an Origination Network;
    calls originating via or appearing to originate via an access point of an Origination Network (such as a PLMN cell site or sector, a wired access point, or other access type and information);
    a time/date at which to start testing;
    a time/date at which testing should conclude;
    the number of test calls to be performed;
    a rate (calls per unit of time) at which test calls should occur (which may be specified as different rates at different days, times, days of the-week, times of year).
3. The method of claim 1, wherein the test calls represent either ordinary emergency calls or enhanced or advanced emergency calls.
4. The method of claim 1, which further includes reporting results of said determining including determining an appropriate entity to receive the report.

5. The method of claim 1, wherein said establishing the set of test calls includes a Session Initiation Protocol (SIP) message initiating the calls, said message including information identifying an entity originating the calls and an identifier valid within or associated with the entity permitting subsequent reconciliation of a test call.

6. The method of claim 5, wherein the information permits an entity to request an initiator of the set of test calls to cease initiating or otherwise modify or alter the initiation of further test calls within the set.

7. The method of claim 1, wherein initiation of the test calls includes a Session Initiation Protocol (SIP) message including information requesting a recipient of the message to perform one or more additional tests or actions.

8. The method of claim 7, wherein the information includes a request to the recipient to perform a call back test.

9. The method of claim 7, which further includes generating a Session Initiation Protocol (SIP) message including information reporting a result of the requested one or more additional tests or actions.

10. The method of claim 9, wherein the information includes a result of a call back test.

11. The method of claim 1, wherein said establishing the set of test calls includes a Session Initiation Protocol (SIP) message initiating the calls, said Session Initiation Protocol (SIP) message including information identifying an entity originating the calls and an identifier valid within or associated with the entity sufficient to identify the test, the criteria under which the calls were established, or otherwise permitting reconciliation of results of the set of test calls.

12. The method of claim 1, wherein the test calls represent vehicle initiated emergency calls.

13. The method of claim 12, wherein after a test call is established, a receiver of the test call sends a request to a call originator to send an updated or alternate data set or to perform another action.

14. The method of claim 1, wherein the test calls represent non interactive or sensor initiated calls.

15. The method of claim 1, wherein the test calls represent calls associated with transportation equipment such as motorcycles, wheelchairs, bulldozers or other construction equipment.

16. A method of determining the routing of a test emergency call towards an emergency services provider, comprising:
    determining if the test emergency call originated by or on behalf of an authorized entity;
    determining if the call contains location information; and
    if both are satisfied, using the contained location information to determine the routing towards an emergency services provider.

17. A system for testing an emergency calling system including a test call responder and a test call generator,
    said test call responder including receiving means responsive to parameters from a test call profile for determining whether a test call from said test profile has been received,
    reporting means, in said test call responder, responsive to said receiving means for reporting whether or not the receiving means has received said test call, and
    said test call generator including generator means responsive to said test call profile for generating and transmitting test calls with parameters matching parameters from said profile.

18. The system of claim 17, further including a test call manager including managing means for controlling operations of said test call responder and said test call generator.

19. The system of claim 18, which includes means allowing a consumer to initiate a 9 1 1 test call.

20. The system of claim 19, which includes means to limit a number of test calls that can be initiated by one or more consumers.

21. The system of claim 18, wherein said test call manager and said test call responder are integrated.

22. The system of claim 18, wherein said test call manager and said test all generator are integrated.

23. The system of claim 17, which includes means to detect a failure in the delivery of a test call initiated by a consumer based on the test call profile.

24. The system of claim 17, which includes means to notify a consumer of results of a consumer initiated test call.

25. The system of claim 17, where the test call profile defines a stress test and which includes means to detect failures in the stress test.

26. The system of claim 17, which includes means responsive to a failure of the delivery of a test call from a test call generator to a test call responder, to notify agents identified in a test call profile.

27. The system of claim 17, wherein the test call profile includes at least one of the following parameters:
    a. Test Profile Number;
    b. Calling number;
    c. Known Caller Location;
    d. Determined Caller Location;
    e. Test start time, or immediate;
    f. Test stop time, or continuous;
    g. Number of test calls to be made, or continuous;
    h. Time interval between test calls;
    i. Expected PSAP identification;
    j. Callback number;
    k. Agents to be notified of test status or failure and notification methods and details;
    l. Audio files to be played to a consumer with the results of a consumer initiated test call; and
    m. Text files to be sent to a consumer with the results of a consumer initiated test call.

28. The system of claim 17, wherein the test call profile includes at least one of the following parameters:
    a. Call Generator Identification;
    b. Calling number;
    c. Test start time, or immediate;
    d. Test stop time, or continuous;
    e. Number of test calls expected to be received, or continuous;
    f. The expected caller location;
    g. The Originating Service Provider identification;
    h. The expected time between calls;
    i. Agents to be notified of test status or failure and notification methods and details;
    j. Audio files to be played to a consumer upon receipt of a consumer initiated test call; and
    k. Text files to be sent to a consumer upon receipt of a consumer initiated test call.

29. A method of testing an emergency calling system based on transmitting a Session Initiation Protocol (SIP) message from a first device, seeking to initiate a test, to a second device, the SIP message comprising:
    a first set of information related to a communication request or session between the first device and the second device;
    information identifying the first device and/or an entity operating the first device;
    information identifying a set of communication requests or sessions of which the SIP message is a part; and information identifying how the second device, or an entity associated with the second device can request the first device to pause, cease, or alter remaining communication requests or sessions in the set of communication requests.

* * * * *